(12) United States Patent
Hirose et al.

(10) Patent No.: US 11,729,503 B2
(45) Date of Patent: Aug. 15, 2023

(54) IMAGE CAPTURING APPARATUS AND CONTROL METHOD THEREOF

(71) Applicant: CANON KABUSHIKI KAISHA, Tokyo (JP)

(72) Inventors: Minoru Hirose, Kanagawa (JP); Kuniaki Sugitani, Kanagawa (JP); Yasuyuki Suzuki, Kanagawa (JP); Satoshi Kimoto, Saitama (JP); Ryotaro Takahashi, Tokyo (JP); Takayuki Akaguma, Tokyo (JP); Kengo Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 17/132,686

(22) Filed: Dec. 23, 2020

(65) Prior Publication Data

US 2021/0203856 A1    Jul. 1, 2021

(30) Foreign Application Priority Data

Dec. 27, 2019    (JP) .................................. 2019-238006

(51) Int. Cl.
*H04N 23/67*    (2023.01)
*G06F 3/01*    (2006.01)
(Continued)

(52) U.S. Cl.
CPC ........... *H04N 23/675* (2023.01); *G06F 3/013* (2013.01); *G06T 7/20* (2013.01); *G06T 7/73* (2017.01);
(Continued)

(58) Field of Classification Search
CPC ......... H04N 5/232127; H04N 5/23216; H04N 5/23299; H04N 5/76; H04N 5/23245; H04N 5/232122; H04N 5/23219; H04N 5/2353; H04N 9/045; H04N 5/232; H04N 5/33; H04N 5/36961; H04N 5/77; H04N 5/772; H04N 9/8205; H04N 23/611; H04N 23/63;
(Continued)

(56) References Cited

U.S. PATENT DOCUMENTS 5,333,029 A * 7/1994 Uchiyama .............. G02B 7/287
396/234
5,614,985 A * 3/1997 Odaka .................... G03B 13/02
396/51
(Continued)

FOREIGN PATENT DOCUMENTS

JP    2005249831 A    9/2005

*Primary Examiner* — Lin Ye
*Assistant Examiner* — Tuan H Le
(74) *Attorney, Agent, or Firm* — Canon U.S.A., Inc. IP Division

(57) ABSTRACT

An image capturing apparatus includes a memory device that stores a set of instructions, and at least one processor that executes the set of instructions to function as, a first detection unit configured to detect a position of a gazing point in an image based on a line-of-sight of a user, a first setting unit configured to set an object detection range based on the position of the gazing point and an image capturing condition, a second detection unit configured to detect a feature area from the image, and a second setting unit configured to set a focus detection area based on a position of the feature area included in the object detection range.

18 Claims, 20 Drawing Sheets

(51) Int. Cl.
  *G06T 7/73*  (2017.01)
  *G06T 7/20*  (2017.01)
  *H04N 5/76*  (2006.01)
  *H04N 23/62*  (2023.01)
  *H04N 23/695*  (2023.01)
  *H04N 23/667*  (2023.01)

(52) U.S. Cl.
  CPC ............... *H04N 5/76* (2013.01); *H04N 23/62* (2023.01); *H04N 23/695* (2023.01); *H04N 23/667* (2023.01)

(58) Field of Classification Search
  CPC ........... H04N 23/67; G06F 3/013; G06T 7/20; G06T 7/73; G06T 2207/30201; G06T 7/246; G06T 2207/10016
  See application file for complete search history.

(56) References Cited

U.S. PATENT DOCUMENTS

| | | | | |
|---|---|---|---|---|
| 2002/0057908 A1* | 5/2002 | Otani | .................... | G03B 13/02 396/51 |
| 2016/0323504 A1* | 11/2016 | Ono | .................. | H04N 9/04515 |
| 2018/0227481 A1* | 8/2018 | Kimura | .............. | H04N 5/23293 |
| 2019/0147618 A1* | 5/2019 | Sugimoto | .............. | G03B 17/00 348/222.1 |

* cited by examiner

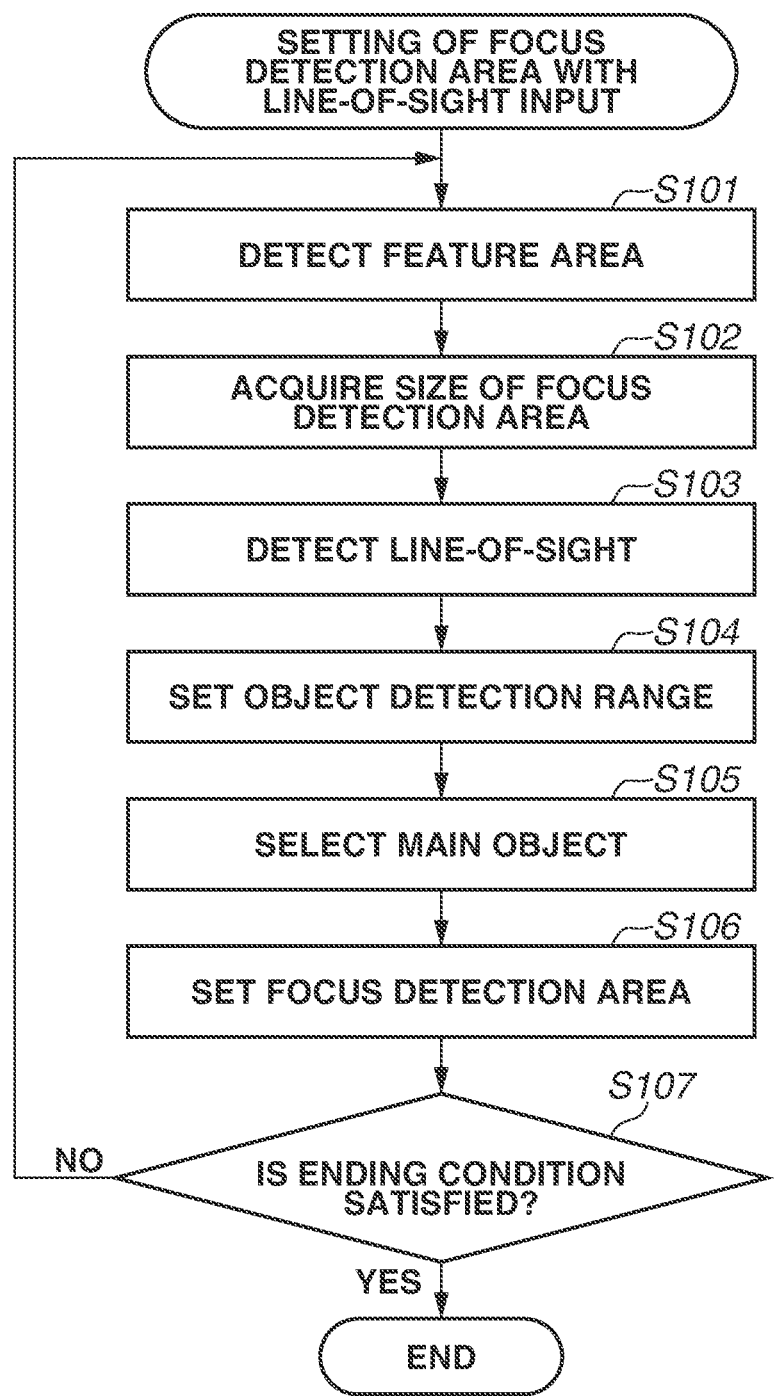

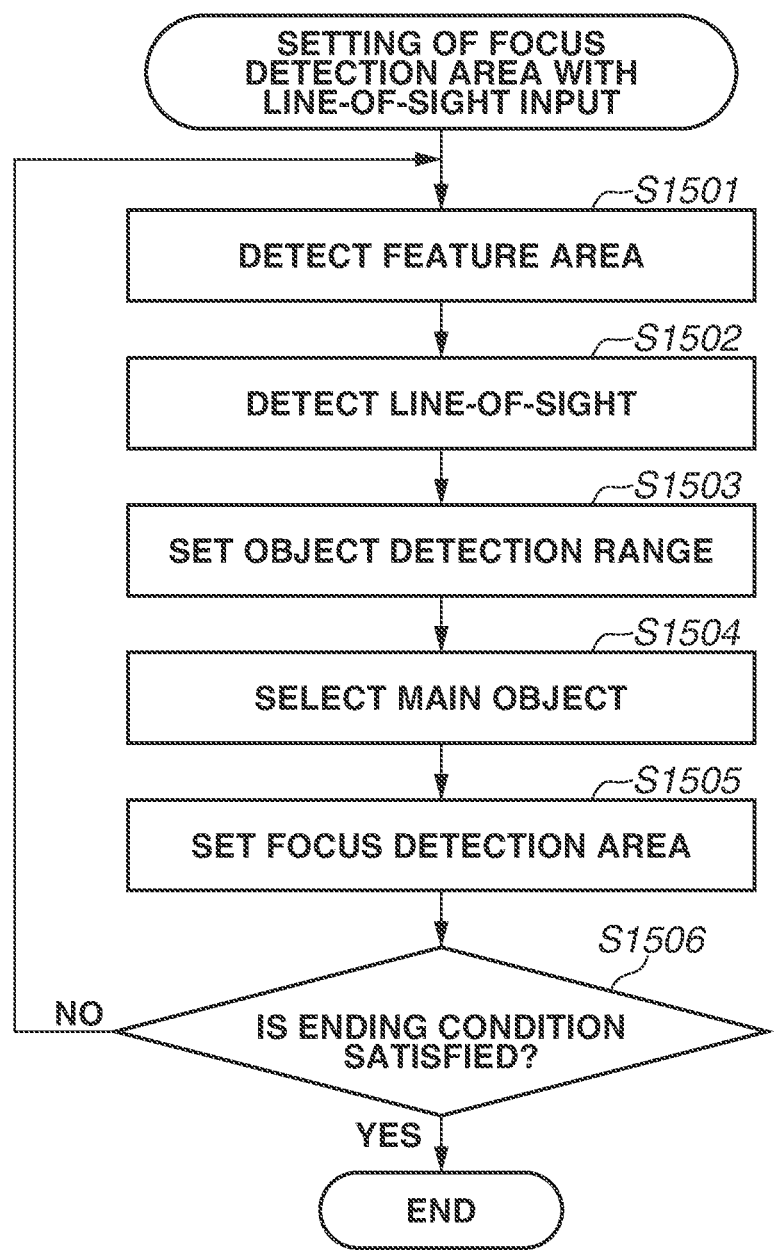

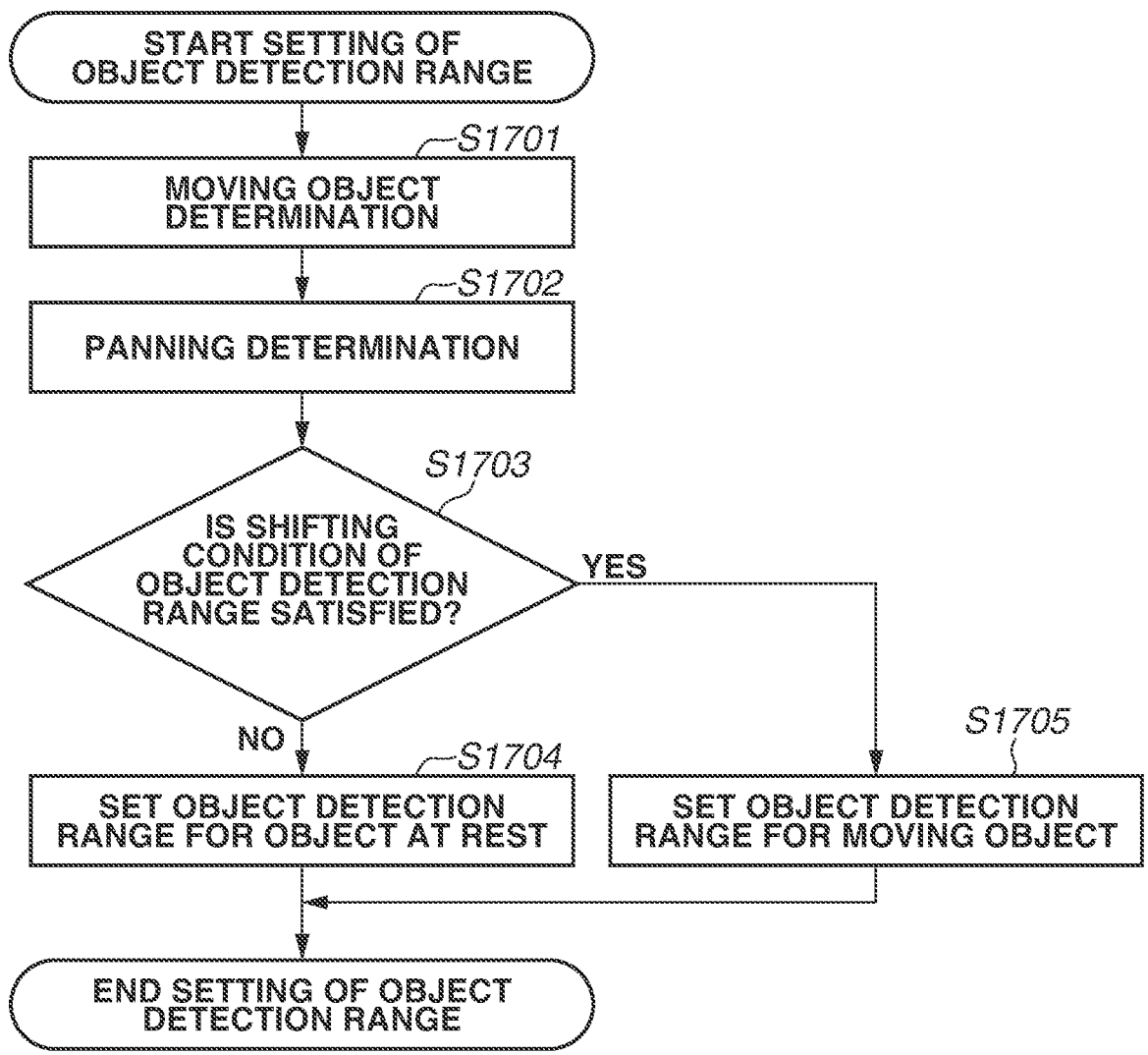

FIG.18A
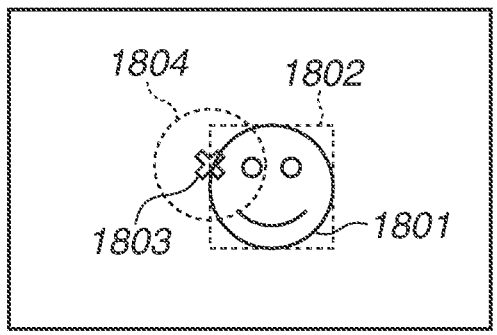
FIG.18B
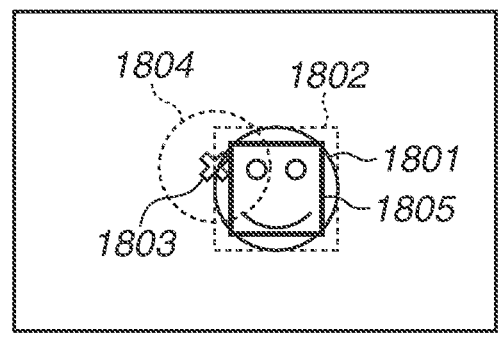
FIG.18C
OBJECT TRAVELLING
DIRECTION OR PANNING
DIRECTION
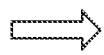
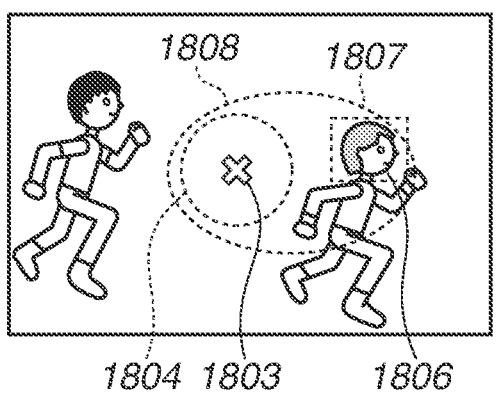
FIG.18D
OBJECT TRAVELLING
DIRECTION OR PANNING
DIRECTION
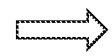
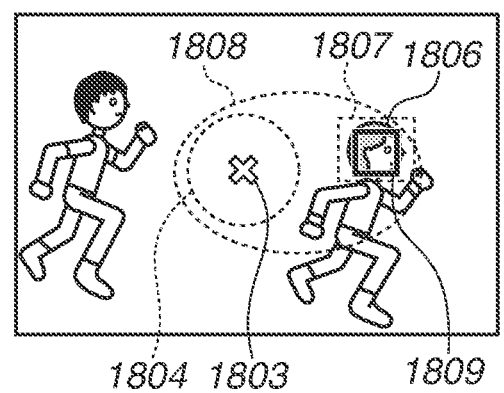

| ITEM | SETTING VALUE | | |
|---|---|---|---|
| | -1 | 0 | +1 |
| FOLLOWABILITY A | 1/2 | 1 | 2 |

| ITEM | SETTING VALUE | | |
|---|---|---|---|
| | -1 | 0 | +1 |
| FOLLOWABILITY A | 1/2 | 1 | 2 |
| FOLLOWABILITY B | 2 | 1 | 1/2 |

IMAGE CAPTURING APPARATUS AND CONTROL METHOD THEREOF

BACKGROUND OF THE INVENTION

Field of the Invention

The present invention relates to an image capturing apparatus and a control method thereof, in particular, to a technique for supporting selecting of a main object.

Description of the Related Art

Conventionally, there has been provided an image capturing apparatus which makes it possible to select one candidate area from among a plurality of candidate areas having a same size and arranged at fixed positions by using a line-of-sight (Japanese Patent Application Laid-Open No. 2005-249831). In such an image capturing apparatus, from among detection areas previously set for respective candidate areas, a candidate area corresponding to a line-of-sight determination area including coordinates of a gazing point in an image obtained from a line-of-sight direction is regarded as an area selected by a user.

For example, in order to make it possible to select one image area from among image areas having indefinite sizes and arranged at indefinite positions with a line-of-sight, the line-of-sight determination area also has to be set dynamically. However, such a technique has not been provided conventionally.

SUMMARY OF THE INVENTION

The present invention is directed to an image capturing apparatus and a control method thereof capable of appropriately setting a line-of-sight determination area which makes it possible to select one image area from among a plurality of image areas in indefinite sizes arranged at indefinite positions by using a line-of-sight. According to an aspect of the present invention, an image capturing apparatus includes a memory device that stores a set of instructions, and at least one processor that executes the set of instructions to function as, a first detection unit configured to detect a position of a gazing point in an image based on a line-of-sight of a user, a first setting unit configured to set an object detection range based on the position of the gazing point and an image capturing condition, a second detection unit configured to detect a feature area from the image, and a second setting unit configured to set a focus detection area based on a position of the feature area included in the object detection range.

Further features of the present invention will become apparent from the following description of exemplary embodiments with reference to the attached drawings.

BRIEF DESCRIPTION OF THE DRAWINGS

FIG. 8 is a flowchart illustrating a setting of a focus detection area according to the first exemplary embodiment.

FIG. 15 is a flowchart illustrating a setting of a focus detection area according to the third exemplary embodiment.

FIG. 17 is a flowchart illustrating setting processing of an object detection range according to a fifth exemplary embodiment.

FIGS. 18A to 18D are diagrams illustrating object detection ranges according to the fifth exemplary embodiment.

DESCRIPTION OF THE EMBODIMENTS

Figure 1:
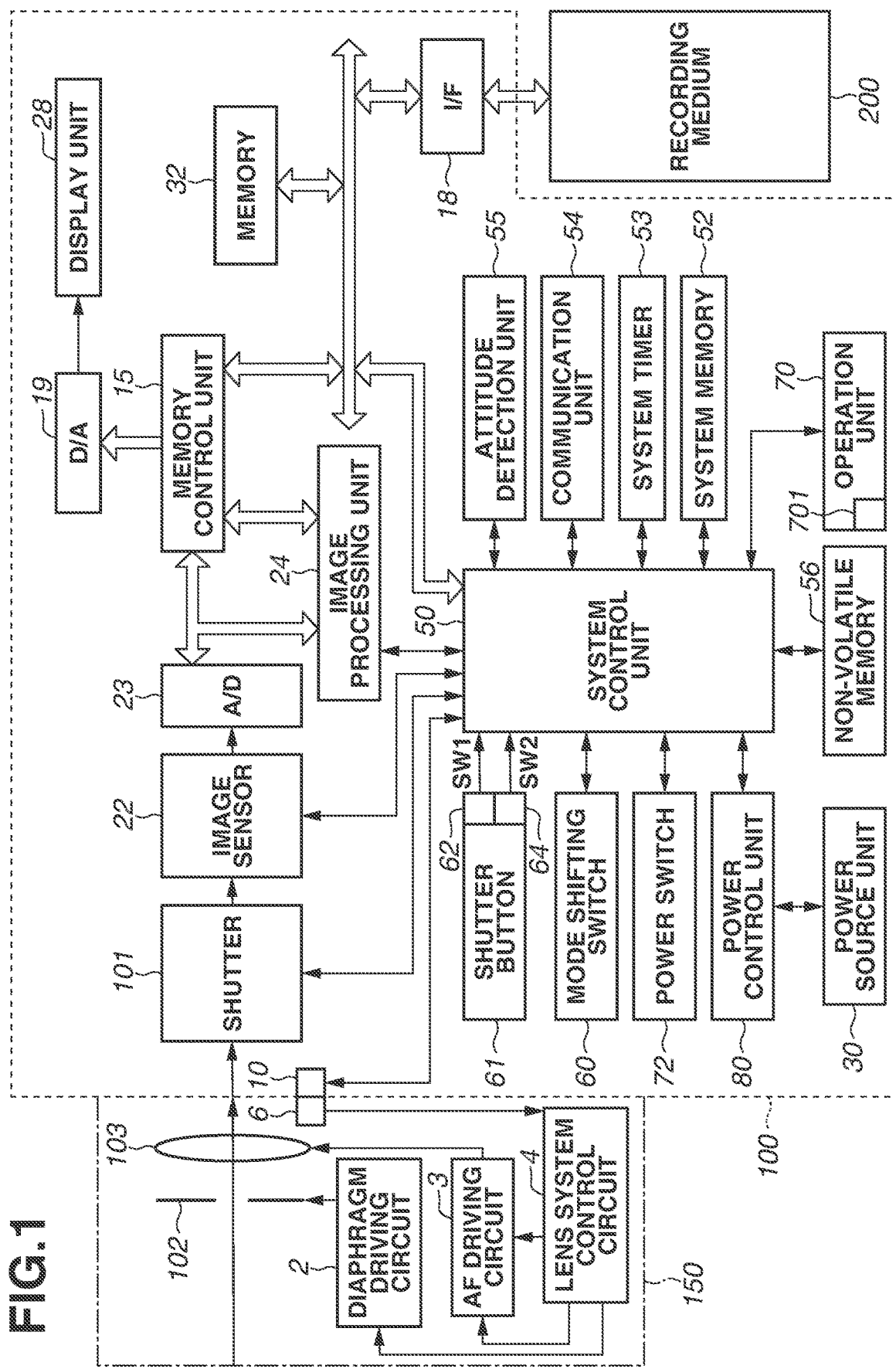
FIG. 1 is a block diagram illustrating an example of a functional configuration of an image capturing apparatus according to an exemplary embodiment.

Hereinafter, with reference to the appended drawings, the present invention will be described in detail based on its illustrative exemplary embodiments. The below-described exemplary embodiments are not intended to limit the present invention according to the scope of the appended claims. Although a plurality of features is described in the exemplary embodiments, not all of the features are necessary for the present invention, and the plurality of features may be optionally combined. Further, in the appended drawings, the same reference numerals are applied to constituent elements identical or similar to each other, and duplicative descriptions thereof will be omitted.

In the below-described exemplary embodiments, the present invention is implemented by an interchangeable lens digital camera. However, the present invention is applicable to optional electronic apparatuses having a line-of-sight detection function and an image capturing function. Video cameras, computer apparatuses (e.g., personal computers, tablet-type computers, media players, and personal digital assistants (PDAs)), mobile phones, smartphones, gaming machines, robots, drones, and dashboard cameras are included in the above-described electronic apparatuses. These apparatuses are merely examples, and the present invention is applicable to the other electronic apparatuses. Furthermore, the present invention is also applicable to a configuration in which the line-of-sight detection function and the image capturing function are respectively arranged on mutually-communicable separate apparatuses such as a main body and a remote controller.

<Configuration of Image Capturing Apparatus>

FIG. 1 is a block diagram illustrating an example of a functional configuration of a digital camera system as one example of an image capturing apparatus according to a first exemplary embodiment of the present invention. The digital camera system includes a main body 100 of an interchangeable lens digital camera and a lens unit 150 attachable to and detachable from the main body 100. The employment of an interchangeable lens is not indispensable for the present invention.

The lens unit 150 includes a communication terminal 6. The communication terminal 6 is brought into contact with a communication terminal 10 provided on the main body 100 when the lens unit 150 is mounted on the main body 100. Power is supplied to the lens unit 150 from the main body 100 through the communication terminals 10 and 6. Further, a lens system control circuit 4 and a system control unit 50 of the main body 100 can bidirectionally communicate via the communication terminals 10 and 6.

A lens group 103 included in the lens unit 150 is an imaging optical system configured with a plurality of lenses including a movable lens. The movable lens includes at least a focus lens. Depending on the lens unit 150, the movable lens may further include either or both of a variable magnification lens and an image-blur correction lens. An autofocus (AF) driving circuit 3 includes a motor and an actuator for driving the focus lens. A lens system control circuit 4 controls the AF driving circuit 3 to drive the focus lens. A diaphragm driving circuit 2 includes a motor actuator for driving a diaphragm 102. The lens system control circuit 4 controls the diaphragm driving circuit 2 to adjust an opening amount of the diaphragm 102.

A mechanical shutter 101 is driven by the system control unit 50 to adjust exposure time of an image sensor 22. The mechanical shutter 101 is kept in a fully-opened state while moving image capturing is being executed.

For example, the image sensor 22 is a charge-coupled device (CCD) image sensor or a complementary metal-oxide semiconductor (CMOS) image sensor. A plurality of pixels is two-dimensionally arranged on the image sensor 22, and one microlens, one color filter, and one or more photoelectric conversion units are arranged on each of the pixels. In the present exemplary embodiment, a plurality of photoelectric conversion units is arranged on each of the pixels, and signals can be read out by each of the photoelectric conversion units. Such a configuration of the pixels enables the generation of a captured image, a parallax image pair, and image signals for a phase difference AF from the signal read from the image sensor 22.

An analog-to-digital (A/D) conversion unit 23 is used for converting an analog image signal output from the image sensor 22 to a digital image signal (image data). The A/D conversion unit 23 may be included in the image sensor 22.

Figure 2A:
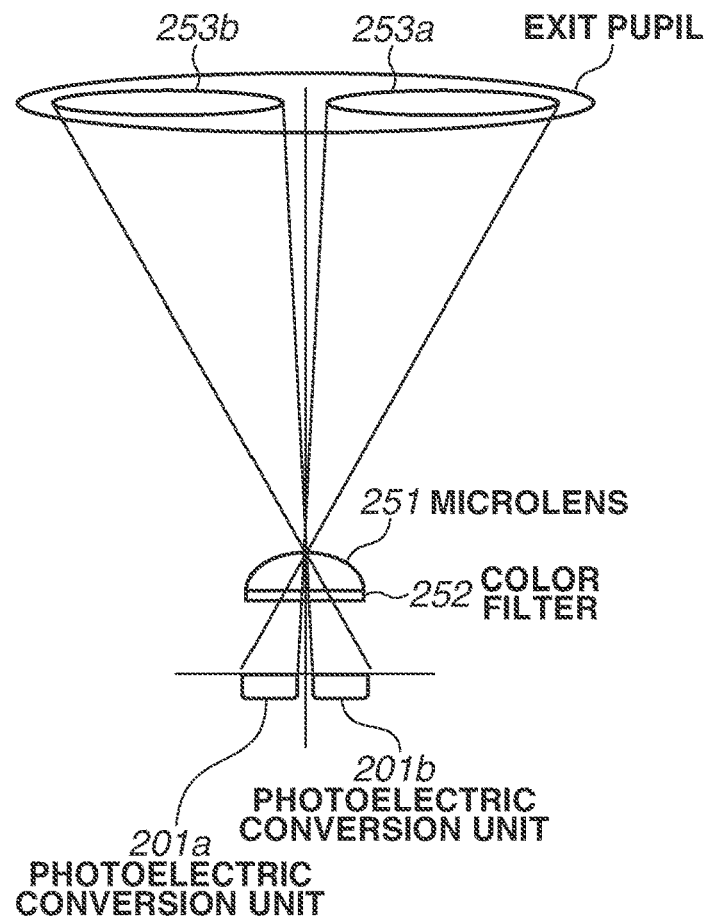
FIGS. 2A and 2B are diagrams illustrating examples of a correspondence relationship between an exit pupil and a photoelectric conversion unit of the image capturing apparatus according to an exemplary embodiment.

FIG. 2A is a diagram schematically illustrating a correspondence relationship between an exit pupil and respective photoelectric conversion units of the lens unit 150 in a case where a pixel included in the image sensor 22 has two photoelectric conversion units.

Two photoelectric conversion units 201a and 201b arranged on a pixel share one color filter 252 and one microlens 251. Light passing through a partial area 253a of the exit pupil is incident on the photoelectric conversion unit 201a, and light passing through a partial area 253b of the exit pupil is incident on the photoelectric conversion unit 201b.

Thus, in each of pixels included in a pixel area, an image formed by a signal read from the photoelectric conversion unit 201a and an image formed by a signal read from the photoelectric conversion unit 201b form a parallax image pair. Further, this parallax image pair can be used as image signals (an A-image signal and a B-image signal) for the phase difference AF. Furthermore, a normal image signal (captured image) can be acquired by adding the signals read from the photoelectric conversion unit 201a and 201b for each pixel.

Figure 2B:
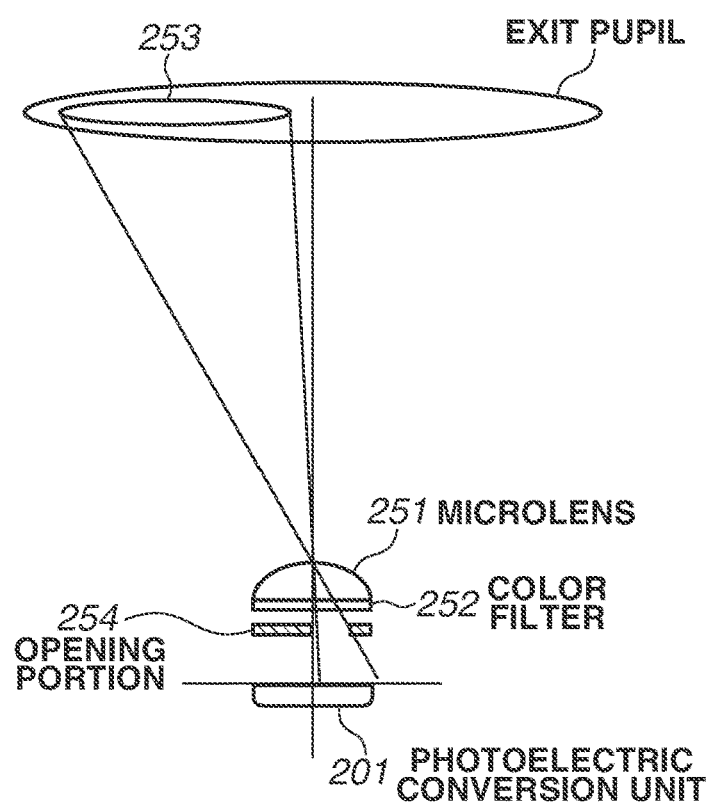

In the present exemplary embodiment, each of the pixels arranged on the image sensor 22 functions as a pixel for generating signals for the phase difference AF (i.e., focus detection pixel) and also as a pixel for generating a normal image signal (image capturing pixel). However, a part of the pixels arranged on the image sensor 22 may be used as dedicated focus detection pixels, and the other pixels may be used as image capturing pixels. FIG. 2B illustrates an example of a configuration of a dedicated focus detection pixel and an exit pupil area 253 through which incident light passes. The focus detection pixel having the configuration illustrated in FIG. 2B functions in a manner similar to the photoelectric conversion unit 201b of FIG. 2A. Practically, the focus detection pixels having the configuration illustrated in FIG. 2B and another type of focus detection pixels functioning in a manner similar to the photoelectric conversion unit 201a in FIG. 2A are dispersedly arranged on the entire portion of the image sensor 22. Thus, a focus detection area having an optional size can be substantially arranged at an optional place.

While an image sensor for acquiring an image for recording is used as a phase difference AF sensor in the configuration illustrated in each of FIGS. 2A and 2B, the present invention does not depend on the AF method as long as a focus detection area of an indefinite size arranged at an indefinite position is useable. For example, the present invention is applicable to a configuration using a contrast AF method. In a case were only the contrast AF method is used, each of the pixel has only one photoelectric conversion unit.

Referring back to FIG. 1, image data (RAW image data) output from the A/D conversion unit 23 is processed by an image processing unit 24 as necessary, and stored in a memory 32 through a memory control unit 15. The memory 32 is used as a buffer memory for temporarily storing image data and audio data, and also used as a video memory for a display unit 28.

The image processing unit 24 executes predetermined image processing on image data to generate a signal and image data, and acquires and/or generates various types of information. For example, the image processing unit 24 may be a dedicated hardware circuit which is designed for realizing a specific function, such as an application specific integrated circuit (ASIC), or may be a constituent element in which a processor, such as a digital signal processor (DSP), executes software to realize a specific function.

Herein, image processing which is applied by the image processing unit 24 includes pre-processing, color interpolation processing, correction processing, detection processing, data processing, and evaluation value calculation processing. The pre-processing includes an amplification of signals, an adjustment of a reference level, and a correction of defective pixels. The color interpolation processing, also called de-mosaic processing, is processing of interpolating a value of a color component that is not included in image data. The correction processing includes an adjustment of a white balance, a correction processing of luminance of an image, a correction processing of an optical aberration derived from the lens unit 150, and color correction processing. The detection processing includes processing of detecting and tracking a feature area (e.g., a face area or a human body area) and processing of recognizing a person. The data processing includes scaling processing, encoding and decoding processing, and header information generation processing. The evaluation value calculation processing includes processing of calculating an image signal pair used for the phase difference AF, an evaluation value used for the contrast AF, and an evaluation value used for the auto-exposure control. These pieces of processing are merely examples of the image processing executable by the image processing unit 24, and are not intended to limit the image processing executed by the image processing unit 24. Further, the evaluation value calculation processing may be executed by the system control unit 50.

A digital-to-analog (D/A) conversion unit 19 generates an analog signal suitable for display on the display unit 28 from display image data stored in the memory 32, and supplies the generated analog signal to the display unit 28. The display unit 28 includes, for example, a liquid crystal display device, and performs display based on the analog signal supplied from the D/A conversion unit 19.

By continuously capturing a moving image and performing display of the captured moving image, the display unit 28 can function as an electronic view finder (EVF). A moving image that is displayed to cause the display unit 28 to function as the EVF is called a live-view image. The display unit 28 may be provided inside the main body 100 to allow a user to conduct an observation through an eyepiece portion, or may be provided on a housing surface of the main body 100 to allow a user to conduct observation without using the eyepiece portion. The display unit 28 may be provided on both of the internal portion and the housing surface of the main body 100.

The system control unit 50 is, for example, a central processing unit (CPU) also called a micro-processing unit (MPU). The system control unit 50 controls the operation of the main body 100 and the lens unit 150 to realize the function of the camera system by reading a program stored in the non-volatile memory 56 to the system memory 52 and executing the program. The system control unit 50 transmits various commands to the lens system control circuit 4 through communication executed via the communication terminals 10 and 6 to control the operation of the lens unit 150.

The non-volatile memory 56 may be a rewritable memory. The non-volatile memory 56 stores a program which is executed by the system control unit 50, various setting values of the camera system, and image data for a graphical user interface (GUI). The system memory 52 is a main memory which is used when the system control unit 50 executes a program.

The system control unit 50 executes auto-exposure (AE) control processing based on the evaluation value generated by the system control unit 50 itself or the image processing unit 24, and determines an image capturing condition, which is a part of the operations of the system control unit 50. For example, image capturing conditions for capturing a still image are a shutter speed, an aperture value, and a sensitivity. Depending on the AE mode set thereto, the system control unit 50 determines one or more image capturing conditions from among the shutter speed, the aperture value, and the sensitivity. The system control unit 50 controls the aperture value (opening amount) of a diaphragm mechanism of the lens unit 150. Further, the system control unit 50 controls the operation of the mechanical shutter 101.

Furthermore, the system control unit 50 drives the focus lens of the lens unit 150 based on the evaluation value or the defocus amount generated by the system control unit 50 itself or the image processing unit 24 to execute autofocus (AF) detection processing of bringing an object within the focus detection area into focus with the lens group 103.

Figure 4A:
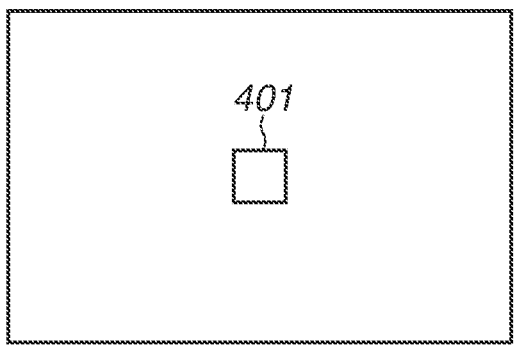
FIGS. 4A and 4B are explanatory diagrams of focus detection areas according to a first exemplary embodiment.
Figure 4B:
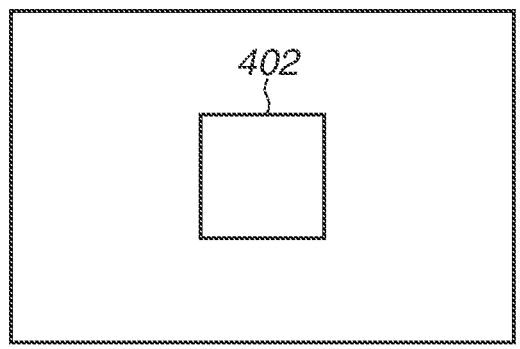

Further, the main body 100 of the present exemplary embodiment includes a plurality of focus detection areas in different sizes. FIG. 4A is a schematic diagram illustrating a one-point AF area mode in which a relatively small focus detection area 401 is set. This AF area mode is suitable for a case where an almost motionless object is to be brought into focus with pinpoint accuracy. FIG. 4B is a schematic diagram illustrating a zone AF area mode in which a relatively large focus detection area 402 is set. In this AF area mode, an object can be easily captured in a frame in bringing a fast-moving object into focus. Here, while the two AF area modes have been described, the main body 100 may provide more than two AF area modes.

A system timer 53 is a built-in clock and is used by the system control unit 50.

An operation unit 70 includes a plurality of input devices which are operable by the user, such as a button, a switch, and a dial. A part of the input devices included in the operation unit 70 has a name corresponding to a function allocated thereto. A shutter button 61, a mode shifting switch 60, and a power switch 72 are included in the operation unit 70, while these elements are illustrated separately from the operation unit 70 for the sake of convenience. In a case where the display unit 28 is a touch display, a touch panel is also included in the operation unit 70. Operations performed on the input devices included in the operation unit 70 are monitored by the system control unit 50. In response to the system control unit 50 detecting the operation performed on the input device, the system control unit 50 executes processing depending on the detected operation.

The shutter button 61 includes a first shutter switch (SW1) 62 and a second shutter switch (SW2) 64. The SW1 is brought into an ON state when the shutter button 61 is pressed halfway, and the SW2 is brought into an ON state when the shutter button 61 is completely pressed. In response to the detection of the ON state of the SW1, the system control unit 50 executes a preparation operation of preparing still image capturing. The preparation operation includes the AE processing and the AF processing. In response to the detection of the ON state of the SW2, the system control unit 50 captures a still image based on the image capturing condition determined through the AE processing and executes a recording operation of recording the still image.

The mode shifting switch 60 which is an operation unit for shifting and setting the above-described AF area mode enables a user to select one AF area mode from among the AF area modes having focus detection areas in different sizes.

Further, the operation unit 70 of the present exemplary embodiment includes a line-of-sight detection unit 701 which detects a line-of-sight direction of the user. While the line-of-sight detection unit 701 is not a member directly operated by the user, the line-of-sight detection unit 701 is included in the operation unit 70 because the line-of-sight direction detected by the operation unit 70 is treated as an input.

Figure 3A:
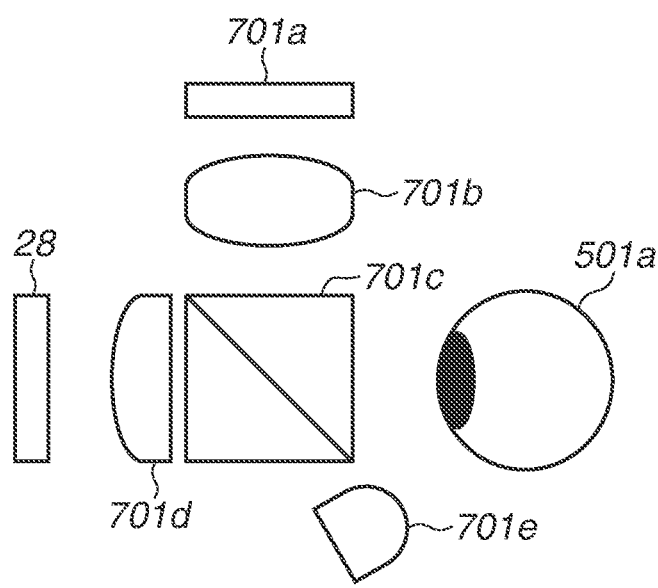
FIGS. 3A and 3B are schematic diagrams illustrating a configuration example of a line-of-sight detection unit according to an exemplary embodiment.
Figure 3B:
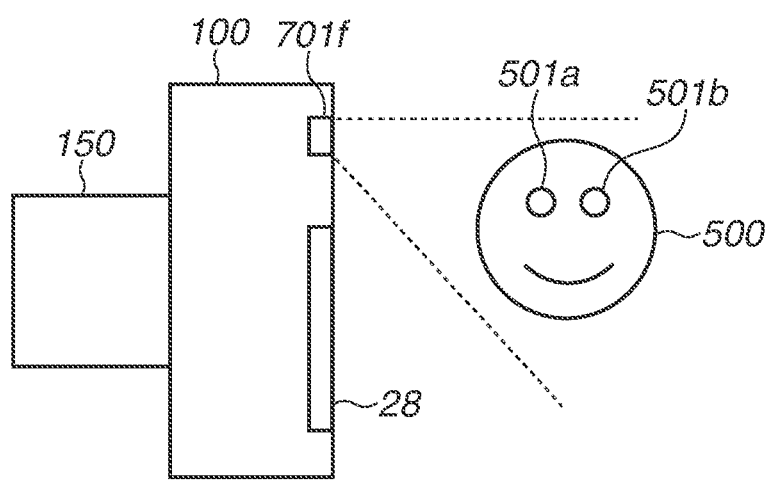

FIGS. 3A and 3B are each a side view schematically illustrating a configuration example of the line-of-sight detection unit 701 arranged inside a viewfinder. The line-of-sight detection unit 701 detects, as the line-of-sight direction, a rotation angle of an optical axis of an eyeball 501*a* of the user who is looking at the display unit 28 arranged inside the main body 100 through the eyepiece on the viewfinder. A position at which the user is gazing at in the display unit 28 (i.e., a gazing point in a display image) can be specified based on the detected line-of-sight direction.

The display unit 28 displays, for example, a live-view image, and the user can observe items displayed on the display unit 28 through an eyepiece lens 701*d* and a dichroic mirror 701*c* by looking into an eyepiece window. A light source 701*e* can emit infrared light in a direction of the eyepiece window (i.e., the direction outward from the main body 100). In a case where the user is looking into the viewfinder, the infrared light emitted from the light source 701*e* is reflected on the eyeball 501*a* and returned to the inside of the viewfinder. The infrared light entering through the viewfinder is reflected by the dichroic mirror 701*c* in the direction toward a light-receiving lens 701*b*.

The light-receiving lens 701*b* forms an eyeball image based on the infrared light on an image plane of the image sensor 701*a*. The image sensor 701*a* is a two-dimensional image sensor having a filter for infrared image capturing. The number of pixels arranged on the image sensor 701*a* for line-sight-detection may be less than the number of pixels arranged on the image sensor 22 for image capturing. The eyeball image captured by the image sensor 701*a* is transmitted to the system control unit 50. The system control unit 50 detects a position of corneal reflection of infrared light and a position of the pupil from the eyeball image, and detects the line-of-light direction from a positional relationship between the position of corneal reflection and the position of the pupil. Further, the system control unit 50 detects a position at which the user is gazing at in the display unit 28 (i.e., a gazing point in a display image) based on the detected line-of-sight direction. In addition, the image processing unit 24 may detect the position of the corneal reflection and the position of the pupil from the eyeball image, and the system control unit 50 acquires the detected positions from the image processing unit 24.

In addition, the present invention does not depend on a method of line-of-sight detection or a configuration of the line-of-sight detection unit. Thus, the configuration of the line-of-sight unit 701 is not limited to the configuration illustrated in FIG. 3A. For example, as illustrated in FIG. 3B, the line-of-sight may be detected based on a captured image acquired by a camera 701*f* arranged near the display unit 28 on a rear face of the main body 100. A field of view of the camera 701*f* indicated by dotted lines is set so that the face of the user performing image capturing while looking at the display unit 28 is captured by the camera 701*f*. The line-of-sight direction can be detected based on an image of an eye area detected from the image captured by the camera 701*f*. In a case where an infrared image is used, image capturing may be performed in a state where infrared light is projected on an object within the field of view from the light source 701*e* arranged in near the camera 701*f*. A method for detecting the line-of-sight direction from the acquired image may be similar to the method illustrated in FIG. 3A. Further, in a case where a visible light image is used, light does not necessarily have to be projected thereon. In a case where a visible light image is used, the line-of-sight direction can be detected based on a positional relationship between an inner corner of the eye and the iris in the eye area.

Referring back to FIG. 1 again, a power control unit 80 is configured by a battery detection circuit, a direct current-to-direct current (DC-DC) converter, and a switching circuit for switching a block to be energized, and detects the presence or absence of a mounted battery, a battery type, and a remaining battery level. The power control unit 80 controls the DC-DC converter based on a detection result and an instruction of the system control unit 50, to supply necessary voltage to the respective constituent elements including the recording medium 200 for a necessary period. A power source unit 30 includes a battery and an alternate current (AC) adapter.

An interface (I/F) 18 is an interface with the recording medium 200, such as a memory card or a hard disk. A data file, such as a captured image or audio data is recorded in the recording medium 200. The data file recorded in the recording medium 200 is read out via the I/F 18 and is reproduced through the image processing unit 24 and the system control unit 50.

A communication unit 54 realizes communication with an external apparatus via at least any one of wireless communication and wired communication. An image (including a live-view image) captured by the image sensor 22 and an image recorded in the recording medium 200 can be transmitted to the external apparatus through the communication unit 54. Further, image data and various types of information can be received from the external apparatus through the communication unit 54.

An attitude detection unit 55 detects the attitude of the main body 100 in the gravitational direction. The attitude detection unit 55 may be an acceleration sensor or an angular velocity sensor. The system control unit 50 can record orientation information according to the attitude detected by the attitude detection unit 55 during image capturing in a data file that stores image data acquired through the image capturing. The orientation information can be used for, for example, displaying a recorded image in the same orientation as that in the image capturing.

The main body 100 according to the present exemplary embodiment can execute various controls such that the feature area detected by the image processing unit 24 is processed to obtain an appropriate image. Such various controls include, but not limited to, an AF detection for bringing the feature area in focus, an AE control for setting an appropriate exposure value to the feature area, an auto-white balance for setting an appropriate white balance to the feature area, and an auto-flash light amount adjustment for setting an appropriate brightness to the feature area. However, a type of control is not limited to the above. The image processing unit 24 applies a known method to, for example, the live-view image to detect areas determined to be applicable to a predetermined feature as feature areas, and outputs information, such as a position, a size, and a reliability of each of the feature areas, to the system control unit 50. The present invention does not depend on a type of a detection method of the feature area, and a known method can be used for detecting the feature area. Thus, a description of a feature area detection method will be omitted.

The feature area can be used for detecting object information. In a case where the feature area is a face area, for example, the occurrence of a red-eye effect, the presence of an object with closed eyes, and a type of facial expression (e.g., a smiling face) may be detected as the object information, but the object information is not limited thereto.

According to the present exemplary embodiment, the image capturing system supports a user operation of selecting one feature area (hereinafter, called "main object area"), which is used for executing various controls or acquiring the object information, from among feature areas, which are examples of image areas having indefinite sizes arranged at indefinite positions. Hereinafter, a detected line-of-sight of the user is called a line-of-sight input.

<Characteristics of Line-of-Sight Input>

One of the characteristics of the line-of-sight input is instability of the line-of-sight direction due to the line-of-sight input being based on a living body. The eyeball may make a slight movement or the user may unintentionally remove a gaze even if the user is trying to gaze at one point. Accordingly, in order to specify a gazing point in the image, a line-of sight direction detected for a certain period of time has to be statistically processed. Thus, the position of the gazing point is smoothed through noise reduction processing based on a plurality of positions of the gazing point detected in a predetermined period. The noise reduction processing is executed in such a way that a noise reduction effect becomes greater as a size of a focus detection area is smaller.

<Overview of Method for Selecting Main Object (or Main Object Area) with Line-of-Sight Input>

In the present exemplary embodiment, a line-of-sight direction at a current time is determined by reducing or preventing dispersion of line-of-sight detection results through calculation of an average value of the line-of-sight directions continuously detected in a predetermined period. Further, an object detection range in which an object is detected is set for the line-of-sight, based on a size of the focus detection area set by the selected AF area mode. In a case where a feature area detected from the image is included in the object detection range, this feature area is regarded as a main object area, and a focus detection area is set to a position of the main object area.

A method for selecting a main object with the line-of-sight input will be described in detail with reference to FIGS. 5A to 5D. FIGS. 5A to 5D are diagrams each schematically illustrating examples of an operation for detecting a face area as a feature area. In each of FIGS. 5A to 5D, the image processing unit 24 detects face areas 504 and 505 from an image that includes two faces 502 and 503.

Figure 5A:
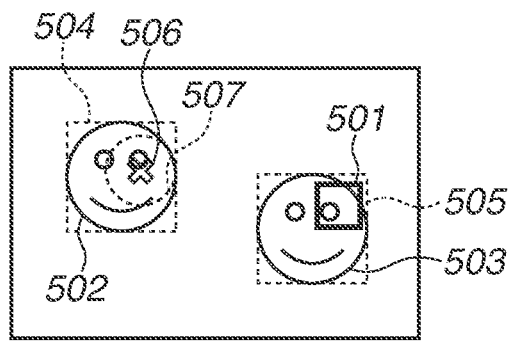
FIGS. 5A to 5D are diagrams relating to an object detection range according to the first exemplary embodiment.
Figure 5B:
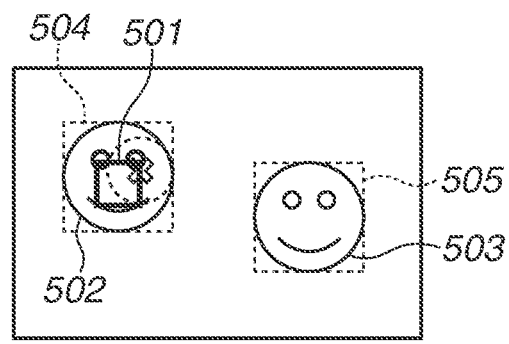

In each of FIGS. 5A and 5B, the one-point AF area mode which is suitable for bringing an almost motionless object into focus with pinpoint accuracy is selected as the AF area mode, and a relatively small focus detection area 501 is set. A line-of-sight direction 506 in FIG. 5A illustrates a line-of-sight direction at a certain time obtained by statistically processing the information detected by the line-of-sight detection unit 701. The system control unit 50 sets a relatively small object detection range 507 for the line-of-sight direction 506 based on the set size of the focus detection area 501, to detect a main object with higher pinpoint accuracy. The system control unit 50 selects a feature area 504 that is most commonly included in the object detection range 507 as a main object, and sets the focus detection area 501 so as to overlap the feature area 504 as illustrated in FIG. 5B.

Figure 5C:
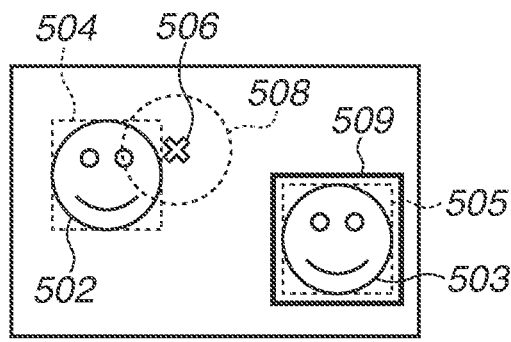
Figure 5D:
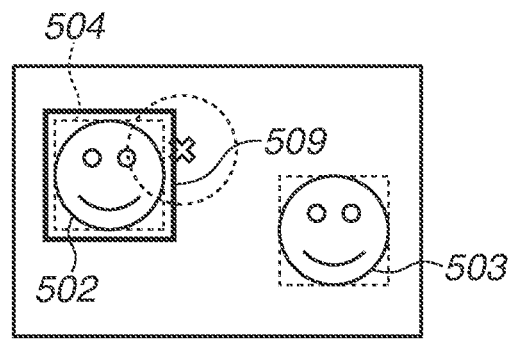

In each of FIGS. 5C and 5D, the zone AF area mode which enables a user to easily capture an object in a frame is selected, as an AF area mode, in bringing a fast-moving object into focus, and a relatively large focus detection area 509 is set. The line-of-sight direction 506 in FIG. 5C illustrates a line-of-sight direction at a certain time obtained by statistically processing the information detected by the line-of-sight detection unit 701. The system control unit 50 sets a relatively large object detection range 508 for the line-of-sight direction 506 based on the set size of the focus detection area 509, to facilitate the capturing of the main object. The system control unit 50 selects a feature area 504 that is most commonly included in the object detection range 508 as a main object, and sets a focus detection area 509 so as to overlap the feature area 504 as illustrated in FIG. 5D.

In addition, a method for determining the main object is not limited to the above-described method. For example, from among the plurality of feature areas, a feature area that is closer to the line-of-sight direction or a feature area that falls within the object detection range for a longer period of time may be selected as a main object.

Further, in each of FIGS. 5A and 5C, in a case where an amount of the feature area included in the object detection range 507 or 508 is not a predetermined amount or more, the system control unit 50 does not select a main object, and a position of the focus detection area 501 or 509 is not changed. Alternatively, in a case where an amount of the feature area included in the object detection range 507 or 508 is not the predetermined amount or more, the focus detection area 501 or 509 may be set based on the line-of-sight direction 506.

Figure 6B:
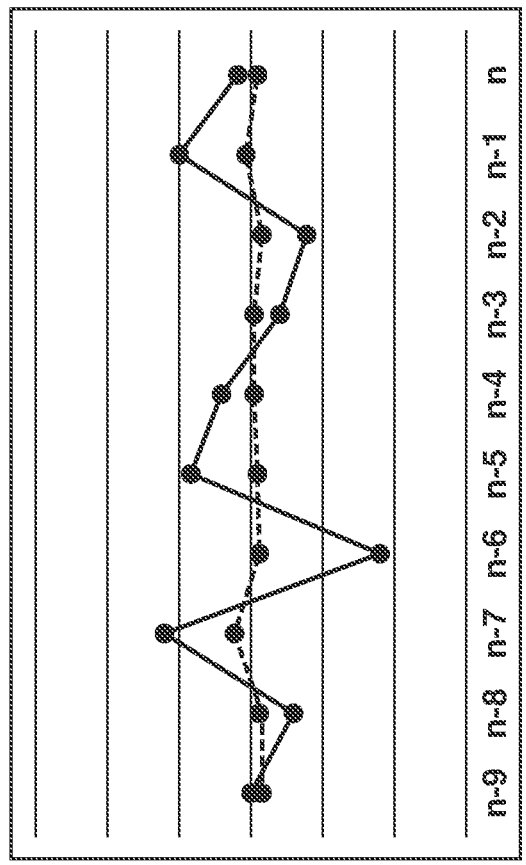
FIGS. 6A and 6B are graphs illustrating averaging processing of a line-of-sight direction according to the first exemplary embodiment.
Figure 6A:
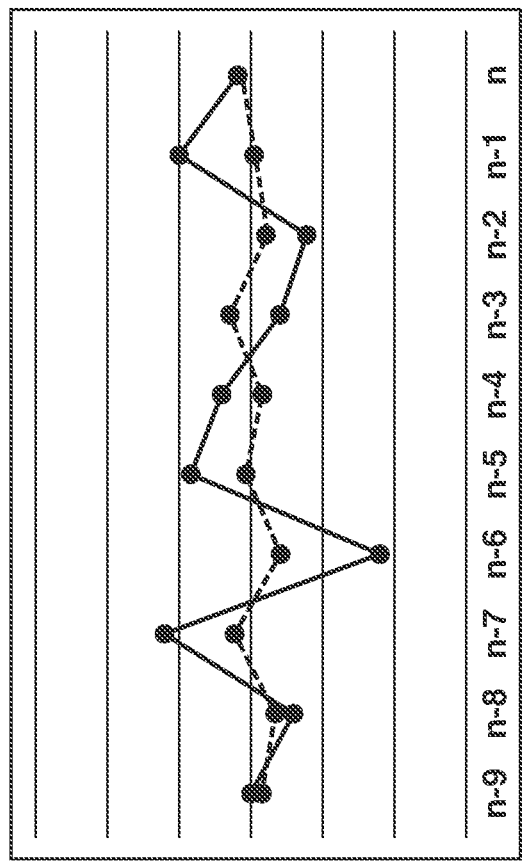

Furthermore, in each of FIGS. 5A and 5C, the system control unit 50 changes an effect of reducing the dispersion of results of the line-of-sight detection based on the size of the object detection range 507 or 508. FIGS. 6A and 6B are graphs illustrating examples of averaging processing of the line-of-sight direction. FIG. 6A is a graph illustrating the processing for reducing dispersion of results of the focus detection in a case where the one-point AF area mode is selected as the AF area mode. A solid line in FIG. 6A indicates the line-of-sight direction in the image output from the line-of-sight detection unit 701, which is regarded as history information continuously output in a period from a current time n to a time n−9. A dotted-line in FIG. 6A indicates calculation results of the line-of-sight direction having been subjected to the averaging processing using the most recent seven pieces of data using the history information. In the one-point AF area mode, it is suitable for bringing an almost motionless object into focus with pinpoint accuracy, so that an effect of reducing dispersion of results of the line-of-sight detection is increased by relatively increasing the number of pieces of data to be used for the averaging processing. FIG. 6B is a graph illustrating the processing for reducing dispersion of results of the focus detection in a case where the zone AF area mode is selected as the AF area mode. A solid line in FIG. 6B indicates the line-of-sight direction in the image output from the line-of-sight detection unit 701, which is regarded as history information continuously output in a period from a current time n to a time n−9. A dotted-line in FIG. 6B indicates calculation results of the line-of-sight direction having been subjected to the averaging processing using the most recent three pieces of data using the history information. In the zone AF area mode, it is suitable for bringing a fast-moving object into focus, and thus, delay due to processing for averaging the line-of-sight detection results is reduced by relatively reducing the number of pieces of data to be used for the averaging processing.

Variation Example

Figure 7A:
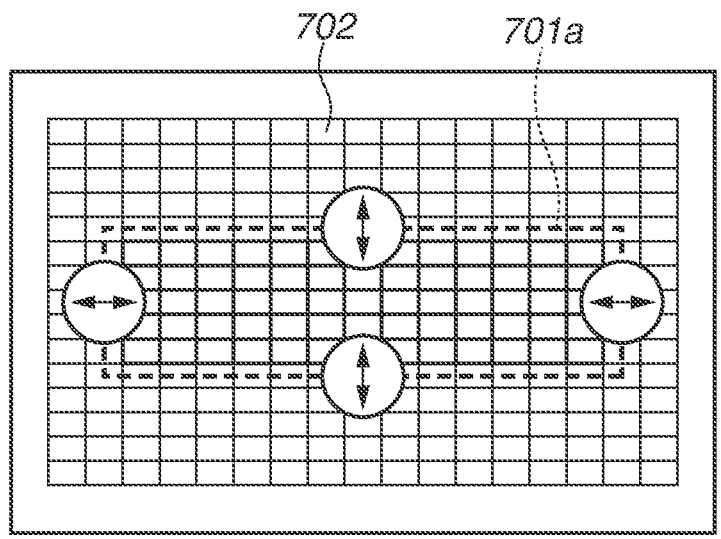
FIGS. 7A and 7B are explanatory diagrams of a flexible zone autofocus (AF) according to the first exemplary embodiment.
Figure 7B:
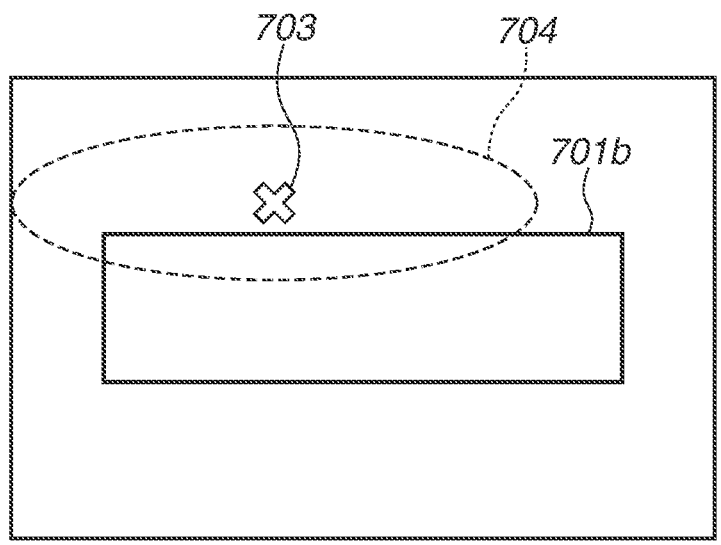

FIGS. 7A and 7B each illustrate an example of a case where a flexible zone AF area mode which allows a user to change a size and a shape of the focus detection area is set as the AF area mode. FIG. 7A illustrates an example of a setting screen for the flexible zone AF area mode, which is displayed on the display unit 28. Based on the input received via the operation unit 70, such as a touch panel and an input device (e.g., a button or a dial), the system control unit 50 appropriately changes a size and a shape of the focus detection area 701*a* along a grid line 702 in correspondence with a user's intention. In addition, a method for setting the focus detection area in the flexible zone AF area mode is not limited to the above described methods. A line-of-sight direction 703 in FIG. 7B illustrates a line-of-sight direction at a certain time obtained by statistically processing the information detected by the line-of-sight detection unit 701. Based on the set size and shape of the focus detection area 701*b*, the system control unit 50 sets an object detection range 704 for a line-of-sight direction 703. In the example illustrated in FIG. 7B, a size and a shape of the focus detection area 701*b* are set to be wide in a lateral direction based on a user's intention. From this setting, it is presumed that a scene includes an object moving in a lateral direction or an image is to be captured in a panning manner. Thus, it is assumed that an error in the line-of-sight direction 703 to be detected increases in the lateral direction because of delay of a live-view image and delay of the averaging processing of the line-of-sight detection results. For this reason, the object detection range 704 longer in the lateral direction is set. In other words, depending on the size and the shape of the focus detection area 701*b*, it is possible to set the object detection range 704 based on the error in the line-of-sight direction 703.

<Operation of Selecting Main Object with Line-of-Sight Input>

Next, operation of selecting a main object with the line-of-sight input according to the present exemplary embodiment will be described with reference to the flowchart in FIG. 8. In this operation, operations relating to generation and display of the live-view image can be executed in parallel during the display of a live-view image on the display unit 28 in an image-capturing stand-by state.

In step S101, the image processing unit 24 executes detection processing of detecting a feature area. The image processing unit 24 outputs the number of detected feature areas and information about each of the feature areas (e.g., a size, a position, and a reliability) to the system control unit 50. The feature area is not limited to a detected human face, and may be any feature areas that can be detectable through a known technique, such as the pattern matching. Examples of the feature areas include a human body area, a pupil area, an animal face area, and a vehicle area. Further, the image processing unit 24 may execute only detection of a feature area candidate.

In step S102, the system control unit 50 acquires a size and a shape of a focus detection area set in the AF area mode which is selectable by the user. In step S103, the system control unit 50 acquires an image from the line-of-sight detection unit 701 and detects a line-of-sight direction as described with reference to FIGS. 3A and 3B. Further, based on the size of the focus detection area acquired in step S102, the system control unit 50 executes the averaging processing on the detected line-of-sight direction through the method described with reference to FIGS. 6A and 6B, and specifies a position at which the user is gazing at (i.e., a position of a gazing point) in the display unit 28 or the live-view image.

In step S104, based on the size and the shape of the focus detection area acquired in step S102, the system control unit 50 sets the object detection range to the position in the live-view image where the user is gazing at (i.e., the position of the gazing point) specified in step S103 through the above described method.

In step S105, the system control unit 50 determines whether the feature area detected in step S101 is included in the object detection range set in step S104, and selects a main object through the method illustrated in FIGS. 5A to 5D.

In step S106, the system control unit 50 sets a focus detection area to a position of the main object in the live-view image selected in step S105.

In step S107, the system control unit 50 determines whether an ending condition, such as a detection of the ON state of the SW1 or the SW2 or detection of a line-of-sight being unavailable, is satisfied. If the system control unit 50 determines that the ending condition is satisfied (YES in step S107), the system control unit 50 determines that the main object determined at that point in time is selected, and ends the processing. If the system control unit 50 determines that the ending condition is not satisfied (NO in step S107), the processing returns to step S101.

As described above, in the present exemplary embodiment, the averaging processing for the line-of-sight direction and setting of the object detection range are appropriately executed based on the user's unstable line-of-sight (a position of a gazing point in an image) and the set size and shape of the focus detection area. With this configuration, a focus detection area can be set in line with the user's intention.

Next, a second exemplary embodiment of the present invention will be described. In the present exemplary embodiment, dispersion of the line-of-sight detection results is acquired in calibration of the line-of-sight detection, and the size of the object detection range is set in accordance with the acquired dispersion of the line-of-sight detection result.

<Calibration of Line-of-Sight Detection>

Figure 9:
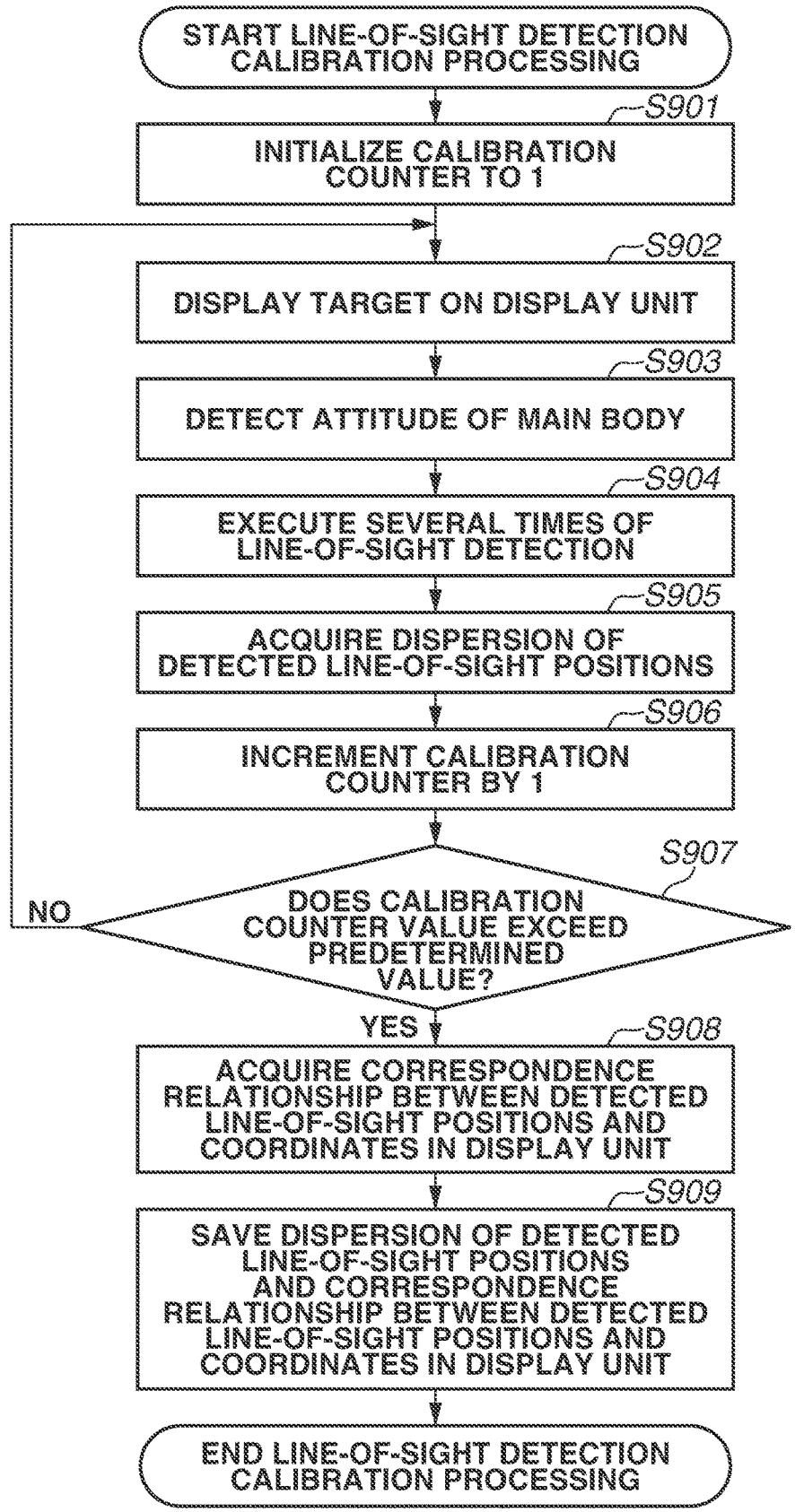
FIG. 9 is a flowchart illustrating line-of-sight detection calibration processing according to a second exemplary embodiment.

FIG. 9 is a flowchart illustrating calibration of line-of-sight detection. Calibration of line-of-sight detection is executed in order to associate a line-of-sight detection result with an optional position in the display unit 28.

In step S901, a calibration counter is initialized to 1. In step S902, a target is displayed on the display unit 28. The target is displayed for the purpose of concentrating the user's line-of-sight on a specific portion. It is desirable that the target be visually recognizable, while it may be formed into an optional shape. The target is displayed at a position associated with the calibration counter.

Figure 10:
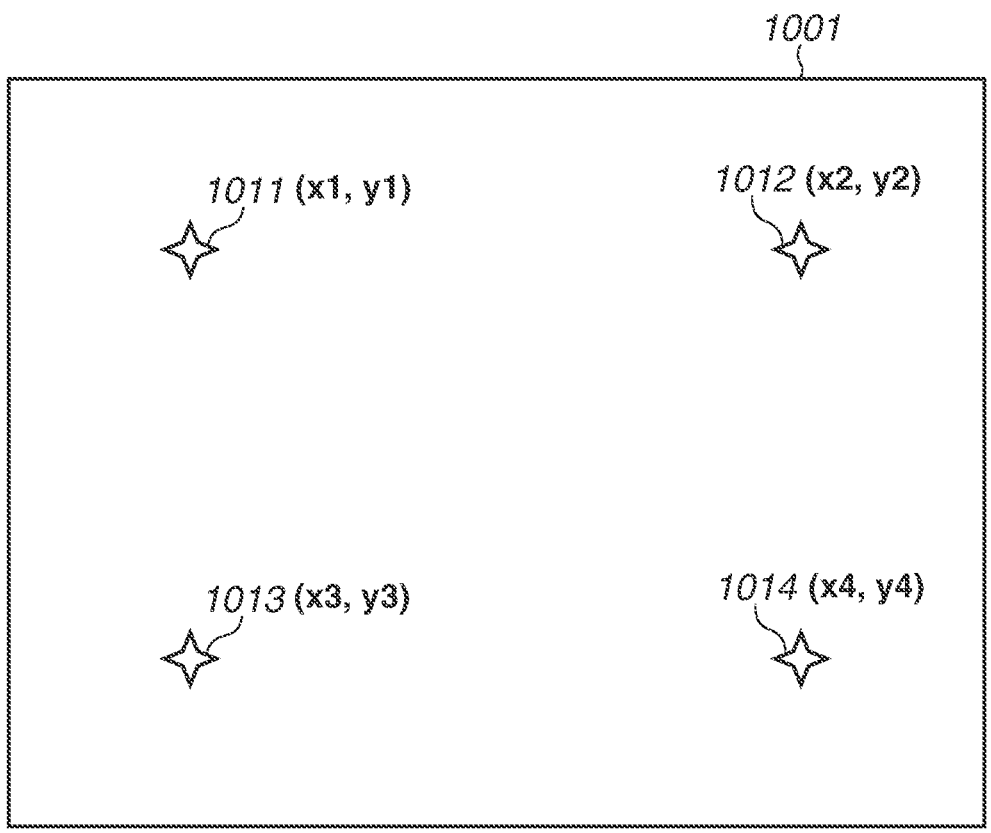
FIG. 10 is a diagram illustrating the line-of-sight detection calibration processing according to the second exemplary embodiment.

FIG. 10 is a diagram illustrating examples of targets 1011, 1012, 1013, and 1014 displayed on a screen 1001 displayed on the display unit 28. For example, when the calibration counter is 1, only a target 1011 is displayed at a position corresponding to an X-Y coordinate (x1, y1) on the screen 1001. When the calibration counter is 2, only a target 1012 is displayed at a position corresponding to an X-Y coordinate (x2, y2) on the screen 1001. When the calibration counter is 3, only a target 1013 is displayed at a position corresponding to an X-Y coordinate (x3, y3) on the screen 1001. When the calibration counter is 4, only a target 1014 is displayed at a position corresponding to an X-Y coordinate (x4, y4) on the screen 1001.

In step S903, an attitude of the main body 100 is detected. The system control unit 50 operates the attitude detection unit 55 to detect the attitude of the main body 100 to detect a line-of-sight position.

In step S904, the system control unit 50 drives the line-of-sight detection unit 701 to detect a user's line-of-sight position. At this time, detection of the user's line-ofsight position is executed several times. Through the above-described processing, it is possible to acquire an average and dispersion of the line-of-sight positions when the user is gazing at the specific portion.

Herein, when the calibration counter is n, an average X-coordinate and an average Y-coordinate of the user's line-of-sight position acquired by the line-of-sight detection unit 701 are expressed as "un" and "vn", respectively.

In step S905, the system control unit 50 acquires dispersion of the user's line-of-sight positions acquired from a plurality of times of detection executed in step S904. Dispersion of the user's line-of-sight positions in the X-direction and dispersions thereof in the Y-direction acquired by the line-of-sight detection unit 701 are respectively expressed as "in" and "jn".

In step S906, the calibration counter is incremented by 1.

In step S907, the system control unit 50 evaluates whether a value of the calibration counter exceeds a predetermined value. The predetermined value is a total number of target's positions displayed on the display unit 28. In the example illustrated in FIG. 10, the predetermined value is "4".

In step S908, a correspondence relationship between the detected line-of-sight position and the target displayed on the display unit 28 is determined. Based on the acquired correspondence relationship, the coordinates in the display unit 28 corresponding to the user's line-of-sight position detected by the line-of-sight detection unit 701 is acquired.

In the example illustrated in FIG. 10, a coordinate (u1, v1) detected by the line-of-sight detection unit 701 corresponds to the coordinate (x1, y1) of the target 1011 on the screen 1001. Further, a coordinate (u2, v2) detected by the line-of-sight detection unit 701 corresponds to the coordinate (x2, y2) of the target 1012. A coordinate (u3, v3) detected by the line-of-sight detection unit 701 corresponds to the coordinate (x3, y3) of the target 1013. A coordinate (u4, v4) detected by the line-of-sight detection unit 701 corresponds to the coordinate (x4, y4) of the target 1014.

Based on the correspondence relationship, information for converting an optional X-coordinate and an optional Y-coordinate acquired by the line-of-sight detection unit 701 after calibration, into an X-coordinate and a Y-coordinate on the screen 1001 is acquired through a method such as linear interpolation.

Based on the above-described correspondence relationship, dispersion of the user's line-of-sight positions acquired in step S905 is converted to dispersion of the X-coordinates and the Y-coordinates on the screen 1001.

In step S909, the correspondence relationship between the detected line-of-sight position and the coordinates in the display unit 28 obtained in step S908 and a resultant obtained by converting the dispersion of the detected user's line-of-sight positions into the coordinates in the display unit 28 are saved in the memory 32. The dispersion of the detected user's line-of-sight positions is saved in association with the detected line-of-sight position. In the example illustrated in FIG. 10, the dispersion when the target 1011 is displayed and the dispersion when the target 1014 is displayed are saved separately. It is assumed that the user looks at various positions on the screen 1001 displayed on the display unit 28 when image capturing is to be executed. In such a condition, it is difficult to measure the dispersion of the detected line-of-sight positions. By contrast, in calibration of the line-of-sight detection, the user's line-of-sight position can be easily fixed by using a target displayed on the screen 1001. Thus, dispersion of the detected line-of-sight positions can stably be acquired. Further, performing the calibration by using a plurality of targets leads to obtain dispersion for each of the detected line-of-sight positions. Furthermore, the attitude of the main body 100 acquired in step S903 may be saved in association with dispersion of the detected line-of-sight positions and the correspondence relationship between the detected line-of-sight position and the coordinates in the display unit 28.

<Use of Dispersion Acquired from Result of Calibration>

Figure 11:
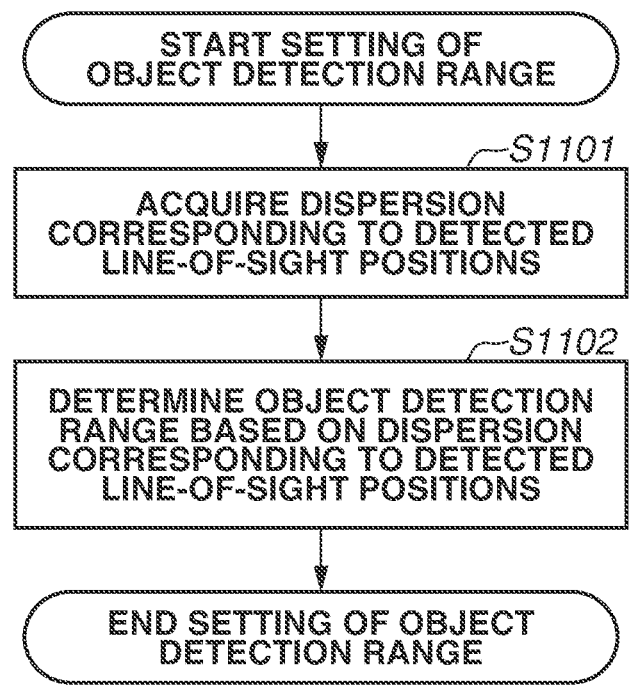
FIG. 11 is a flowchart illustrating setting processing of an object detection range according to the second exemplary embodiment.

Next, an operation for setting the object detection range according to the present exemplary embodiment will be described. In the present exemplary embodiment, how the focus detection area is determined with the line-of-sight input is similar to the processing illustrated in the flowchart in FIG. 8. Details of the processing in step S104 will be described with reference to the flowchart in FIG. 11.

In step S1101, dispersion corresponding to the detected line-of-sight position is acquired. The dispersion of the detected line-of-sight position saved in the memory 32 in step S909 is used. In another variation, dispersion of the detected line-of-sight positions corresponding to the positions of the gazing point saved in the memory, acquired in step S103, may be used. In yet another variation, the attitude of the main body 100 acquired by driving the attitude detection unit 55, and the attitude of the main body 100 and the dispersion of the detected line-of-sight positions corresponding to the position of the gazing point acquired in step S103, which are saved in the memory 32, may be used. In such a way, it is possible to handle a situation in which dispersion of the detected line-of-sight positions changes corresponding to the attitude.

In step S1102, the system control unit 50 sets an object detection range based on the dispersion of the detected line-of-sight position. A magnitude of the dispersion of the detected line-of-sight positions indicates reliability of the detected line-of-sight position. Thus, the system control unit 50 sets a wide object detection range in a case where the dispersion of the detected line-of-sight positions acquired in step S1102 is large, and sets a narrow object detection range in a case where the dispersion of the detected line-of-sight position is small.

In the present exemplary embodiment, the object detection range is set based on the dispersion acquired in calibration of the line-of-sight detection, as described above, which enables the setting of the focus detection area in line with the user's intention.

Next, a third exemplary embodiment of the present invention will be described. In the present exemplary embodiment, a description will be provided of a method for selecting a main object with the line-of-sight input based on a degree of certainty (hereinafter, "reliability") of the line-of-sight direction in line with an image capturing environment.

Initially, a factor that changes the reliability of the line-of-sight direction will be described.

<Factor Arising from Image Capturing Environment>

Reliability characteristics of the line-of-sight direction derived from the image capturing environment changes depending on brightness of a place which the line-of-sight is directed to. For example, when the place is dark, it is hard to specify where the object as an image capturing target is present, and thus, a photographer has to find the object. As a result, a result of the line-of-sight direction becomes unsteady and unstable, instead of a result indicating that the line-of-sight stays at a pinpoint object. In a case where a case in which the line-of-sight direction is fixed to one point is regarded as a good result for the line-of-sight direction, a case in which the line-of-sight direction is unsteady and unstable is regarded as being poor in reliability.

<Factor Arising from Photographer>

Figure 12:
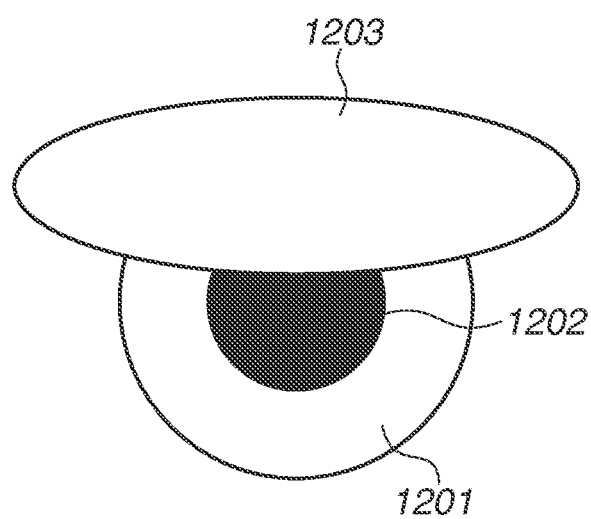
FIG. 12 is a diagram illustrating an eyeball of a photographer according to a third exemplary embodiment.

A reliability characteristic derived from a photographer changes based on, for example, whether or not the photographer's eye is closed or how much the photographer's eyelid covers their eyeball. In a case where the photographer closes the eye in forming an eyeball image on an image plane of the image sensor 701*a* through the light-receiving lens 701*b* with infrared light, a position of the pupil cannot be detected from the formed image. As a result, the line-of-sight direction cannot be detected. FIG. 12 is a diagram illustrating a state where a photographer's eyeball 1201 is partially covered by an eyelid 1203 of a photographer so that a pupil 1202 is halfway hidden under the eyelid 1203. If the photographer's pupil 1202 is hidden under the eyelid 1203 as illustrated in FIG. 12, a position of the pupil 1202 cannot be precisely detected. For example, in a case where an upper part of the pupil 1202 is hidden under the eyelid 1203 as illustrated in FIG. 12, generally, a detection error of the line-of-sight in the upper direction increases. If the pupil is hidden under the eyelid in such a state, a detection accuracy of the line-of-sight direction decreases.

Figure 13A:
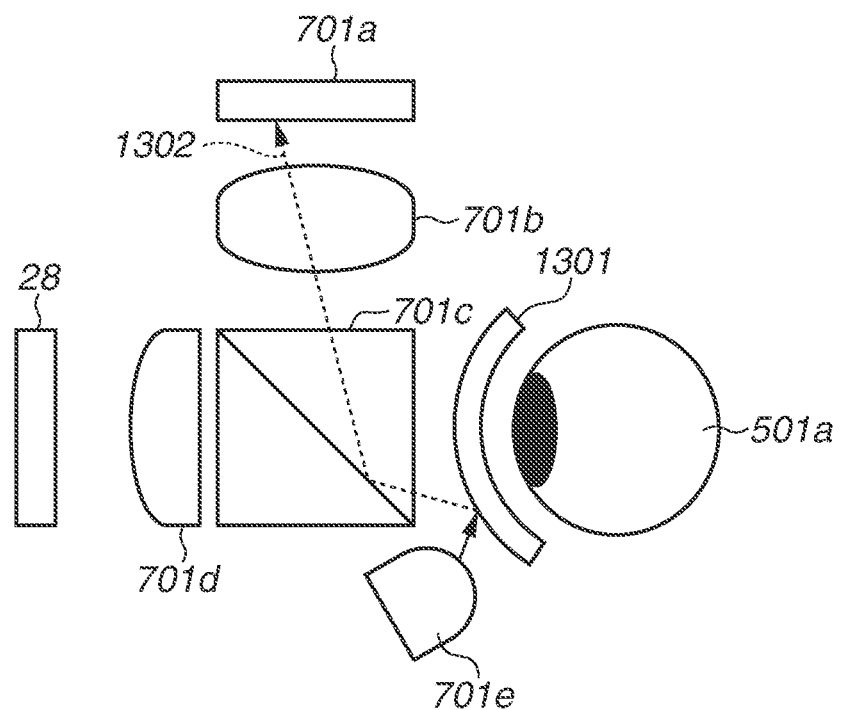
FIGS. 13A and 13B are schematic diagrams illustrating configuration examples of a line-of-sight detection unit according to the third exemplary embodiment.

FIG. 13A is a side view schematically illustrating an infrared light beam 1302 generated when infrared light is reflected on eyeglasses 1301 that is being worn by the photographer. FIG. 13A includes eyeglasses 1301 and the infrared light beam 1302 reflected on the eyeglasses 1301 in addition to the configuration of the schematic diagram illustrated in FIG. 3A, and reference numerals other than 1301 and 1302 are the same as those illustrated in FIGS. 3A and 3B. Thus, descriptions of configurations overlapping those illustrated in FIGS. 3A and 3B will be omitted.

Figure 13B:
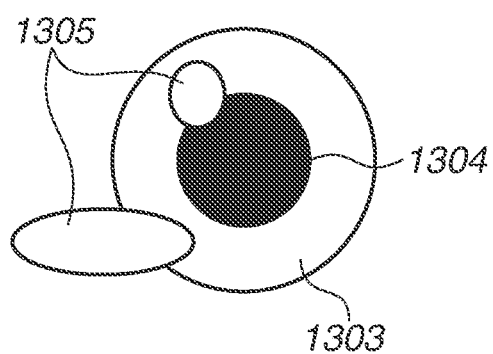

In a case where the photographer wearing the eyeglasses 1301 is looking into a viewfinder, the infrared light beam 1302 emitted from the light source 701*e* is partially reflected on the eyeglasses 1301, and further reflected on the dichroic mirror 701*c* in a direction of the light-receiving lens 701*b*. The light-receiving lens 701*b* causes the infrared light beam 1302 reflected on the eyeglasses 1301 to form a light image on the image plane of the image sensor 701*a*, resulting in the occurrence of a ghost image 1305 on a captured image of the eyeball 1303 as illustrated in FIG. 13B.

If the ghost image 1305 overlaps with the photographer's pupil 1304, a position of the pupil 1304 cannot be detected accurately, resulting in a decrease in a detection accuracy of the line-of-sight direction.

As described above, the line-of-sight direction becomes unstable depending on the image capturing environment, or a detection accuracy decreases due to closing of the eye or the occurrence of a ghost image caused by the photographer's eyeglasses, which arises from a photographer behavior. As a result, reliability of the detected line-of-sight direction degrades. In a case where the reliability of the line-of-sight direction is low, an object detection range, which is set based on that line-of-sight direction, becomes unstable, which causes a decrease in accuracy of object detection.

The reliability of the line-of-sight direction may be set to "low" when the photographer wears eyeglasses, the ghost image occurs, or when it is detected that the pupil is hidden by the eyelid or the closing of the eye. Alternatively, the reliability may be determined based on a degree of dispersion of the past line-of-sight directions detected several times.

Figure 14A:
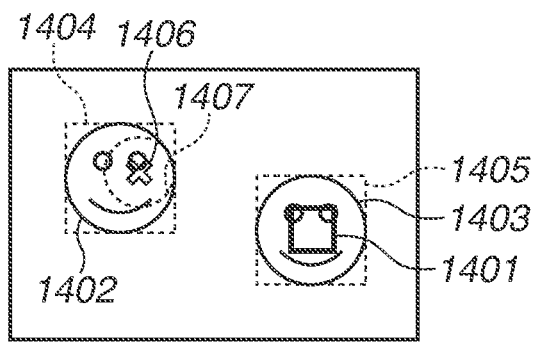
FIGS. 14A to 14C are diagrams illustrating object detection ranges according to the third exemplary embodiment.
Figure 14B:
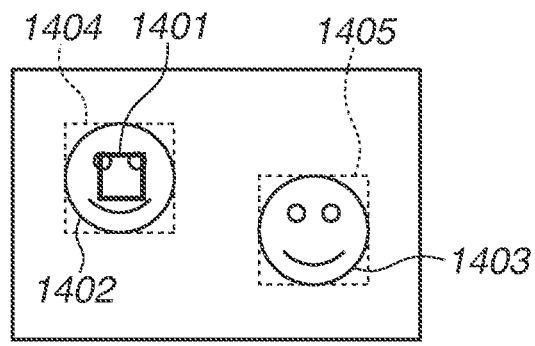
Figure 14C:
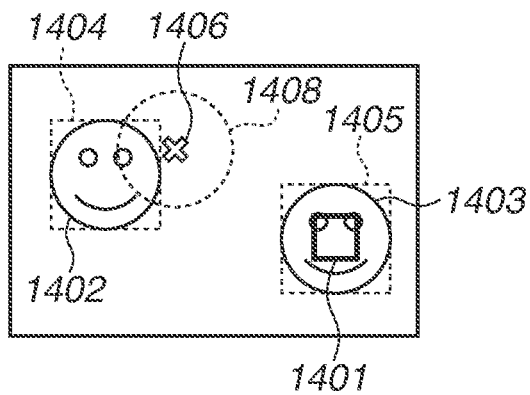

Hereinafter, a description will be provided in detail with reference to FIGS. 14A to 14C of a method for selecting a main object, in which reliability of the line-of-sight direction is reflected. Each of FIGS. 14A to 14C is a diagram schematically illustrating an example of processing of detecting a face area as a feature area. In this example, the image processing unit 24 detects face areas 1404 and 1405 from an image that includes two faces 1402 and 1403.

In each of the schematic diagrams in FIGS. 14A, 14B, and 14C, the one-point AF area mode is selected, and a relatively small focus detection area 1401 is set. In FIGS. 14A to 14C, a focus detection area of the one-point AF area mode is illustrated. However, a focus detection area wider than that in the one-point AF area mode may be set. A line-of-sight direction 1406 in FIG. 14A illustrates a line-of-sight direction at a certain time obtained through statistical processing performed on the information detected by the line-of-sight detection unit 701. In a case where reliability of the detected line-of-sight direction is high, the system control unit 50 sets a relatively small object detection range 1407 to the line-of-sight direction 1406 in order to detect a main object with pinpoint accuracy in a higher degree. The system control unit 50 selects a feature area 1404 that is most commonly included in the object detection range 1407 as a main object, and sets a focus detection area 1401 such that the focus detection area 1401 overlaps with the feature area 1404 as illustrated in FIG. 14B.

In a case where reliability of the detected line-of-sight direction is low, as illustrated in FIG. 14C, the system control unit 50 sets a relatively large object detection range 1408 to the line-of-sight direction 1406 in order to capture the main object more easily. The system control unit 50 selects a feature area 1404 that is most commonly included in the object detection range 1408 as a main object, and sets a focus detection area 1409 such that the focus detection area 1409 overlaps with the feature area 1404 as illustrated in FIG. 14B.

In each of FIGS. 14A and 14C, in a case where an amount of the feature area included in the object detection range is less than a predetermined amount, the system control unit 50 does not select a main object, so that a position of the focus detection area 1401 is not changed. Alternatively, in a case where an amount of the feature area included in the object detection range is less than the predetermined amount, the focus detection area 1401 may be set based on the line-of-sight direction 1406.

<Operation for Selecting Main Object with Line-of-Sight Input>

Next, operation for selecting a main object with the line-of-sight input according to the present exemplary embodiment will be described with reference to the flowchart in FIG. 15. This operation can be executed in parallel with the operations relating to generation and display of the live-view image, when a live-view image is being displayed on the display unit 28 in, for example, an image-capturing stand-by state.

In step S1501, the image processing unit 24 executes a process of detecting a feature area. The image processing unit 24 outputs the number of detected feature areas and information about each of the feature areas (e.g., a size, a position, and the reliability) to the system control unit 50. The feature area is not limited to a detected human face, and may be an optional feature area such as a human body area, a pupil area, an animal face area, and a vehicle area, which are detectable through a known technique, such as the pattern matching. Further, the image processing unit 24 may detect only a feature area candidate.

In step S1502, the system control unit 50 acquires an image from the line-of-sight detection unit 701 and detects a line-of-sight direction described with reference to FIGS. 3A and 3B.

The system control unit 50 further performs the averaging processing on the detected line-of-sight direction through the method described with reference to FIGS. 6A and 6B, and specifies a position at which the user is gazing at (i.e., a position of a gazing point) in the display unit 28 or the live-view image.

In step S1503, based on the position at which the user is gazing at (i.e., the position of the gazing point) in the live-view image specified in step S1502 and reliability thereof, the system control unit 50 sets an object detection range through the above-described method.

In step S1504, the system control unit 50 determines whether the feature area detected in step S1501 is included in the object detection range set in step S1503, and selects a main object through the method described with reference to FIGS. 14A to 14C.

In step S1505, the system control unit 50 sets a focus detection area to a position of the main object in the live-view image selected in step S1504.

In step S1506, the system control unit 50 determines whether an ending condition such as detection of the ON state of the SW1 or the SW2 or detection of a line-of-sight being unavailable is satisfied. If the system control unit 50 determines that the ending condition is satisfied (YES in step S1506), the system control unit 50 determines that the main object determined at that point in time is selected, and ends the processing. If the system control unit 50 determines that the ending condition is not satisfied (NO in step S1506), the processing returns to step S1501.

As described above, in the present exemplary embodiment, the averaging processing of averaging the line-of-sight direction and the setting of the object detection range are appropriately executed based on the user's unstable line-of-sight (a position of a gazing point in an image) and the reliability of the line-of-sight position. With this configuration, the focus detection area can be set in line with the user's intention.

Next, descriptions of the operation in a moving image recording mode will be described as a fourth exemplary embodiment of the present invention, focusing on a difference from the above-described descriptions. The digital camera system according to the present exemplary embodiment is also capable of image capturing and recording of a moving image. In the digital camera system according to the present exemplary, a recording mode is selected and a still image capturing mode and a moving image recording mode are shifted based on an input received via the operation unit 70. Further, a size and a framerate of the moving image to be recorded are selectable. A size can be selected from 4K (H3840×V2160 pixels), 2K (H1920×V1080 pixels), and HD (H1280×V720 pixels), and a framerate can be selected from 240 frames-per-second (fps), 120 fps, 60 fps, 30 fps, and 24 fps. In accordance with these settings, a size and a framerate read from the image sensor 22 are appropriately set in the digital camera, and the digital camera performs operation accordingly.

Figure 16:
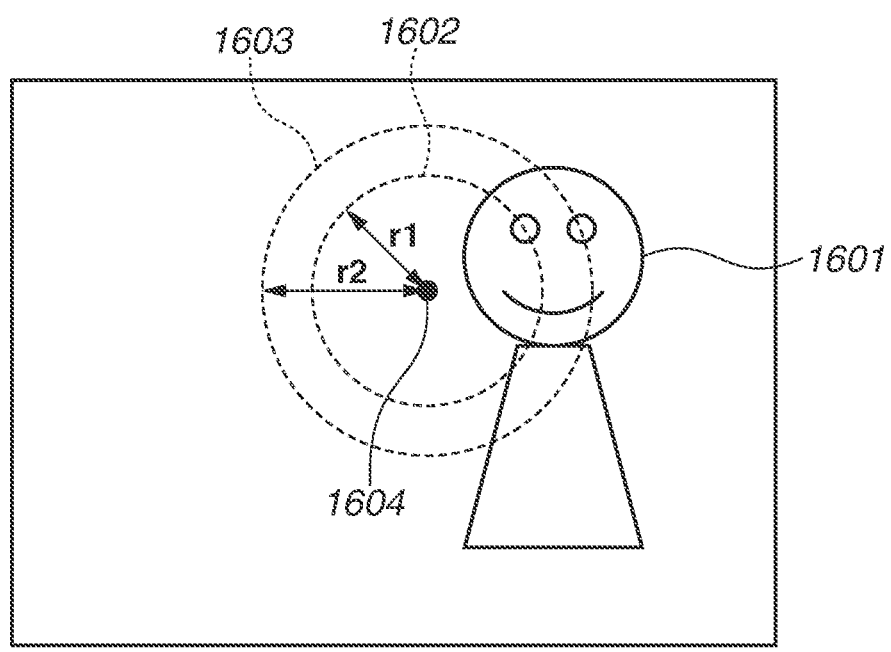
FIG. 16 is a diagram illustrating an object detection range according to a fourth exemplary embodiment.

Here, examples of a detected line-of-sight position and an object detection range in the moving image recording mode are illustrated in FIG. 16. FIG. 16 illustrates an object 1601 and a line-of-sight position 1604. An object detection range for the line-of-sight position 1604 in the moving image recording mode is expressed by a dashed line 1603. This object detection range is illustrated as a circle with a radius r2, with the detected line-of-sight position 1604 at the center thereof. Further, for the purpose of making a comparison, an object detection range in a still image recording mode is expressed by a dashed line 1602 which is a circle with a radius r1 having the detected line-of-sight position 1604 at the center thereof. This indicates that the object detection range in the moving image recording mode is wider than the object detection range in the still image recording mode by an amount corresponding to the radius (r2−r1). This is because an object with motion is normally captured in the moving image recording mode, so that a moving amount thereof is likely to be large. Further, unlike in the still image capturing mode, such scenes increases that the line-of-sight is less likely to be concentrated in a pinpoint manner within a short period in the moving image recording mode, so that it is more likely that a difference between the line-of-sight position and the object position becomes large. For these reasons, the object detection range in the moving image recording mode is set to be wider than in the still image recording mode. Moreover, the widening amount (r2−r1) is changed based on the framerate. The amount is calculated through the following Formula 1 by taking 60 fps as a reference of magnitude.

$$r2=(60/\text{framerate})\times\alpha\times r1 \qquad \text{Formula 1}$$

In Formula 1, a symbol "$\alpha$" represents an enlargement percentage of the object detection range in the moving image recording mode with respect to that of the still image recording mode. In the present exemplary embodiment, "$\alpha$" is equal to 1.2. In addition, on the basis of device characteristics of the line-of-sight detection unit 701, it is only required for "$\alpha$" to satisfy a condition roughly $1<\alpha<1.5$. Here, Formula 1 merely an example of a calculation method and is not limited thereto. Various methods are possible in the present exemplary embodiment. Furthermore, a range of "$\alpha$" may be determined for each system based on various conditions. As described above, the object detection range in the moving image recording mode is wider than the object detection range in the still image recording mode, and a widening amount thereof is determined based on the framerate. Thus, the widening amount becomes smaller as the framerate is higher, and the widening amount becomes larger as the framerate is lower.

As in the above-described exemplary embodiments, the digital camera system has a configuration in which object detection and setting of a focus detection area are set by using the object detection range thus set and operation is performed accordingly.

Next, a fifth exemplary embodiment of the present invention will be described. In the present exemplary embodiment, the movement of the object and the movement of the camera are detected, and a size of the object detection range is set based on the presence or absence of the movement.

<Issue in Line-of-Sight Input in Scenes with Motion>

As described in the first exemplary embodiment, one of the characteristics of the line-of-sight input is instability of the line-of-sight direction due to the line-of-sight input being based on a living body. Thus, statistical processing is employed in order to specify a stable line-of-sight direction. By contrast, an issue arises in a scene with motion, such as a case in which an object is a moving object, or a case in which image capturing is performed while the image capturing apparatus itself is being panned. Specifically, a delay arising from statistical processing for specifying the line-of-sight direction may occur, or a main object intended by the user cannot appropriately be selected due to unintentional displacement of the line-of-sight originated from a living body.

<Overview of Method for Selecting Main Object (or Main Object Area) with Line-of-Sight Input>

In consideration of the above-described issue, a method for selecting a main object with a line-of-sight input according to the present exemplary embodiment, which is suitable for a scene with motion, will be described in detail with reference to FIGS. 18A to 18D.

FIGS. 18A and 18B and FIGS. 18C and 18D illustrate two typical scenes. FIGS. 18A and 18B schematically illustrate an example in which a still face 1801 exists in the scene, and the image processing unit 24 detects a face area (feature area) 1802. A line-of-sight direction 1803 in FIG. 18A illustrates a line-of-sight direction at a certain time obtained by statistically processing the information detected by the line-of-sight detection unit 701. The system control unit 50 sets a relatively small object detection range 1804, so that a user's detailed object specification input by the line-of-sight can be easily reflected on an object at rest. The system control unit 50 selects a face area (feature area) 1802 most commonly included in the object detection range 1804 as a main object, and sets a focus detection area 1805 such that the focus detection area 1805 overlaps with the face area (feature area) 1802 as illustrated in FIG. 18B.

By contrast, FIGS. 18C and 18D schematically illustrating an example in which a moving face 1806 exists in the scene and the image processing unit 24 detects a face area (i.e., feature area) 1807.

As in the line-of-sight direction illustrated in FIG. 18A, a line-of-sight direction 1803 in FIG. 18C illustrates a line-of-sight direction at a certain time obtained through the statistical processing. The system control unit 50 sets a relatively large object detection range 1808, so that an object specification with respect to the moving object, input with the line-of-sight, can be easily reflected for the object which is a moving object. For the purpose of comparing and describing a magnitude relationship between the object detection ranges, the object detection range 1804 used for the object at rest is illustrated in FIG. 18C. As illustrated in the example in FIGS. 18C and 18D, the object detection range 1808 used for a moving object is greater than the object detection range 1804 used for an object at rest.

A result of moving object determination or a result of panning determination of the image capturing apparatus is used for a determination of shifting the object detection ranges between one for the moving object and one for the object at rest.

In the moving object determination according to the present exemplary embodiment, whether or not the object is a moving object is determined by using a motion vector. For example, the system control unit 50 acquires time-series data about a central position of the feature area, and acquires, as the components of the motion vector, a displacement amount and a displacement direction of the central position between the frames averaged over a predetermined number of frames. For a feature area in which a calculated magnitude of the motion vector is a predetermined value or more, it is determined that the object has moved. In addition, the motion vector may be acquired by other methods. Further, information other than the motion vector may be acquired if that information indicates a motion in the in-plane direction in the feature area (object).

In the panning determination according to the present exemplary embodiment, whether or not the image capturing apparatus is being panned is determined based on a current camera-shake amount of the image capturing apparatus acquired by the attitude detection unit 55. For example, the camera-shake amount is angular speed or angular acceleration. If the camera-shake amount is a predetermined camera-shake threshold value or more, it is assumed that panning is detected.

In the present exemplary embodiment, the system control unit 50 determines the arrangement of the object detection range based on the information acquired from the above-described moving object determination and the panning determination. For example, in a case where the object is determined to be a moving object, the object detection range 1808 is set for the line-of-sight direction 1803 based on the calculated magnitude of the motion vector, such that the object detection range 1808 is wide in the travelling direction of the object. Similarly, in a case where the image capturing apparatus is determined to be in a panning state, the object detection range 1808 is set for the line-of-sight direction 1803 based on the panning direction and the camera-shake amount of the image capturing apparatus, such that the object detection range 1808 is wide in the panning direction. In this way, even if a delay occurs in the line-of-sight direction with respect to the target object, the system control unit 50 can select the face area (i.e., feature area) 1807 that is most commonly included in the object detection range as the main object. Thus, the focus detection area 1809 can be set such that the focus detection area 1809 overlaps with the face area (i.e., feature area) 1807 as illustrated in FIG. 18D.

<Setting Operation of Setting Object Detection Range with Line-of-Sight Input>

Next, operation of setting the object detection range according to the present exemplary embodiment will be described. In the present exemplary embodiment, the processing of determining the focus detection area with the line-of-sight input is executed through the processing similar to the processing illustrated in the flowchart in FIG. 8, and thus, details of the processing in step S104 will be described with reference to the flowchart in FIG. 17.

In step S1701, the system control unit 50 calculates a motion vector for each of detected feature areas and executes moving object determination. Details of the determination processing are as described above. The system control unit 50 determines that the object is a moving object in a case where a feature area having a motion vector of a magnitude of a predetermined value or more exists.

In step S1702, the system control unit 50 detects the current camera-shake amount of the image capturing apparatus with the attitude detection unit 55. The System control unit 50 determines that panning is detected in a case where the camera-shake amount is a predetermined camera-shake threshold value or more.

In step S1703, the system control unit 50 determines whether a shifting condition of the object detection range is satisfied. In the present exemplary embodiment, the system control unit 50 determines that the condition is satisfied if either or both of the moving object determination in step S1701 and the panning determination in step S1702 is/are satisfied. In step S1703, if the shifting condition of the object detection range is satisfied (YES in step S1703), the processing proceeds to step S1705. If the shifting condition is not satisfied (NO in step S1703), the processing proceeds to step S1704.

In step S1704, the system control unit 50 sets the object detection range for the position at which the user is gazing at (i.e., the position of the gazing point) in the live-view image specified in step S103 of FIG. 8. In step S1704, the system control unit 50 sets the object detection range for an object at rest, as described with reference to FIGS. 18A and 18B.

In step S1705, the system control unit 50 sets the object detection range for the position at which the user is gazing at (i.e., the position of the gazing point) in the live-view image specified in step S103 of FIG. 8. In step S1705, the system control unit 50 sets the object detection range for a moving object as described with reference to FIGS. 18C and 18D.

As described above, in the present exemplary embodiment, the object detection range is set based on the image capturing state, such as the presence or absence of a moving object or whether panning is performed, so that the main object that is intended by the user is appropriately selected to set the focus detection area.

Next, a sixth exemplary embodiment of the present invention will be described. In the present exemplary embodiment, a size of the object detection range is set based on the intensity of followability of servo AF for continuously performing a focus adjustment on the moving object.

<Issue in Line-of-Sight Input in Scenes with Motion>

An issue similar to that described in the fifth exemplary embodiment arises in a scene with motion, where focus adjustment operation is to be continuously executed because objects are frequently changed.

<Overview of Method for Selecting Main Object (or Main Object Area) with Line-of-Sight Input>

Figures 20A, 20B, 20C:
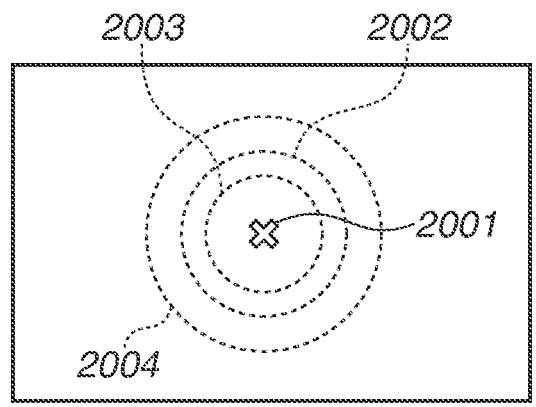
FIGS. 20A to 20C are diagrams illustrating an object detection range according to the sixth exemplary embodiment.

In view of the above-described issue, a detailed description will be provided with reference to FIGS. 20A and 20B of a method for selecting a main object with a line-of-sight input, which is suitable for a scene with motion in the present exemplary embodiment.

FIG. 20A is a table illustrating a relationship between an item (followability A in FIG. 20A), which the user can select to set to the intensity of followability of servo AF, and a coefficient used for calculating a size of the object detection range corresponding to a setting value of this item. In the present exemplary embodiment, a coefficient for an object detection range is determined for a change of a servo followability item (followability A), and a size of the object detection range is changed by using this coefficient.

FIG. 20B is a diagram illustrating examples of the object detection range reflecting the above setting. In the present exemplary embodiment, an object detection range 2002 regarded as a reference is determined based on a user's line-of-sight direction 2001. The object detection range to be actually used is determined by multiplying this reference by the coefficient corresponding to a setting value for the followability A illustrated in FIG. 20A. Accordingly, corresponding coefficients ½, 1, and 2 are respectively used with respect to the setting values −1, 0, and +1 of the followability A, and object detection ranges 2003, 2002, and 2004 having different sizes are determined. In a case where a feature area detected from the image is included in the object detection range associated with the servo followability item, this feature area is regarded as a main object area, so that the focus detection area is set to a position of the main object area.

The followability A according to the present exemplary embodiment is a degree of followability of the servo AF for a change in the object speed, and the user can set a following sensitivity of the servo AF for acceleration and deceleration speed of the object. In this example, the setting of the intensity of the followability A to "high" (i.e., a setting value is set to +1) indicates that capturing of an image of an object with active movement is expected, so that it is presumably difficult for the user to continuously capture the object with the line-of-sight input. Thus, in the present exemplary embodiment, as illustrated in FIGS. 20A and 20B, the object detection range is set to be wider than that in a normal state, so that the main object intended by the user can be appropriately selected.

<Processing of Setting Object Detection Range with Line-of-Sight Input>

Next, processing of setting the object detection range according to the present exemplary embodiment will be described. In the present exemplary embodiment, determination of the focus detection area with the line-of-sight input is executed through the processing similar to the processing illustrated in the flowchart in FIG. 8, details of the processing in step S104 will be described with reference to the flowchart in FIG. 19.

In step S1901, the system control unit 50 reads a setting value currently set to the servo followability saved in the system memory 52.

In addition, the user can set a setting value in advance according to an image capturing state. Any one of the setting values −1, 0, and +1 can be acquired as the setting value to be read, as illustrated in FIG. 20A.

In step S1902, the system control unit 50 selects a coefficient for calculating an object detection range. At this time, the coefficient for calculating the object detection range is selected based on the table information saved in the non-volatile memory 56, in which a relationship between the item of the followability A selectable and settable by the user and a coefficient representing a size of the object detection range associated with a setting value of that item are summarized. The coefficient is selected from any one of ½, 1, and 1 depending on the setting value illustrated in FIG. 20A.

In step S1903, the system control unit 50 sets the object detection range based on the coefficient selected in step S1902. A setting method of the object detection range is as described with reference to FIG. 20B.

As described above, according to the present exemplary embodiment, a size of the object detection range is set based on the followability of servo AF for continuously performing focus adjustment, so that a main object intended by the user is appropriately selected and that a focus detection area can be set.

Variation Example

In the present exemplary embodiment, only one item of the followability of the servo AF is associated with a size of the object detection range. However, the present invention is not limited thereto.

For example, as illustrated in FIG. 20C, a followability B may be newly added, and the object detection range may be calculated based on a coefficient of the object detection range associated with a plurality of setting items.

For example, the followability B according to the present exemplary embodiment is a degree of object changeability, and the user can set sensitivity of the object changeability of the servo AF in a scene including various objects. In this example, the setting of the intensity of the followability B to "high" (i.e., a setting value is set to +1) indicates that capturing an image in a scene is expected in which the objects are frequently changed from one object to another, so that it is desirable that the objects be easily changeable with the user's line-of-sight input. Thus, in the present exemplary embodiment, as illustrated in FIGS. 20A and 20B, the object detection range is set to be narrower than in that a normal state, so that the main object intended by the user can be appropriately selected.

Figure 19:
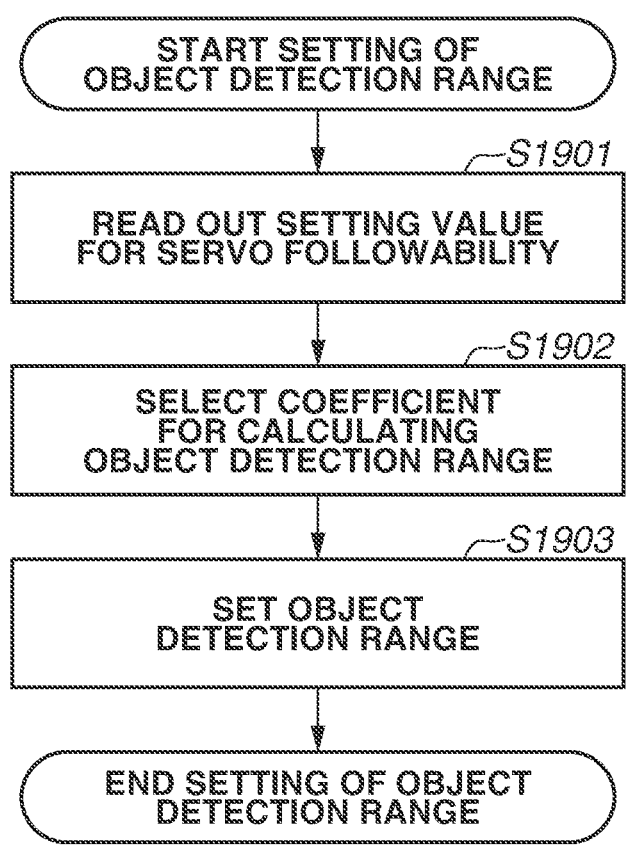
FIG. 19 is a flowchart illustrating setting processing of an object detection range according to a sixth exemplary embodiment.

In a configuration in which a plurality of types of followability can be set, the system control unit 50 acquires setting values of the followability B from the followability A in step S1901 of the flowchart in FIG. 19, and selects the coefficients associated with the respective setting items in step S1902. In step S1903, the system control unit 50 multiplies the plurality of coefficients for the object detection range selected in step S1902 sets the resultant as a final coefficient. However, an upper limit and a lower limit of the coefficient may be provided because a maximum size of a settable object detection range is limited by a size of the live-view image, and a minimum size thereof is limited by dispersion of the line-of-sight direction.

In addition, setting items of the servo followability are not limited to the items described in the present exemplary embodiment of the present invention, and a setting item may be any factor that changes the internal control in the focus adjustment operation executed continuously.

The above-described exemplary embodiments enable appropriate setting of a line-of-sight determination area for enabling a single image area to be selected, with a line-of-sight, from among a plurality of image areas having indefinite sizes and arranged at indefinite positions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-238006, filed Dec. 27, 2019, which is hereby incorporated by reference herein in its entirety.

What is claimed is:

1. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point;
a second detection unit configured to detect a feature area from the image; and
a second setting unit configured to set a position of a focus detection area which is to be arranged in the image based on a position of the feature area included in the object detection range,
wherein the first setting unit sets the object detection range according to a size of the focus detection area.

2. The image capturing apparatus according to claim 1,
wherein the image capturing apparatus is operable in an autofocus area mode,
wherein the autofocus area mode includes at least a first mode in which a focus detection area having a first size is arranged in the image and a second mode in which a focus detection area having a second size larger than the first size is arranged in the image, and
wherein, in the second mode, the first setting unit sets the object detection range to be wider than the object detection range to be set in the first mode.

3. The image capturing apparatus according to claim 1, wherein the first setting unit sets the object detection range according to a shape of the focus detection area.

4. The image capturing apparatus according to claim 1, wherein, in a case where a predetermined amount or more of the feature area is not included in the object detection range, the second setting unit does not change the position of the focus detection area.

5. The image capturing apparatus according to claim 1, wherein, in a case where a predetermined amount or more of the feature area is not included in the object detection range, the second setting unit sets the position of the focus detection area based on the position of the gazing point.

6. The image capturing apparatus according to claim 2, further comprising a smoothing unit configured to smooth, based on a plurality of positions of gazing points detected in a predetermined period, the position of a gazing point,
wherein the smoothing unit smooths a position such that a smoothing effect becomes greater as the size of the focus detection area becomes smaller.

7. The image capturing apparatus according to claim 1, further comprising:
a calibration unit configured to acquire dispersion of a plurality of positions of the gazing points each detected by the first detection unit; and
a first storage unit configured to store the dispersion of the plurality of positions of the gazing points acquired by the calibration unit,
wherein the first setting unit sets the object detection range according to the dispersion of the plurality of positions of the gazing points stored in the first storage unit.

8. The image capturing apparatus according to claim 1 further comprising:
a third detection unit configured to detect an attitude of the image capturing apparatus;

a calibration unit configured to acquire dispersion of a plurality of positions of the gazing points each detected by the first detection unit; and a second storage unit configured to store the dispersion of the plurality of positions of the gazing points acquired by the calibration unit in association with the attitude detected by the third detection unit, wherein the first setting unit sets the object detection range according to the dispersion of the plurality of positions of the gazing points stored in the second storage unit in association with the attitude detected by the third detection unit.

9. The image capturing apparatus according to claim 1, wherein, in a case where a degree of certainty of the position of the gazing point detected by the first detection unit is a first degree of certainty, the first setting unit sets the object detection range wider than the object detection range that is set in a case where the degree of certainty is a second degree of certainty that is greater in a degree of certainty of the position of the gazing point than the first degree of certainty.

10. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point and an image capturing condition;
a second detection unit configured to detect a feature area from the image; and
a second setting unit configured to set a position of a focus detection area which is to be arranged in the image based on a position of the feature area included in the object detection range,
wherein the image capturing condition is a recording mode, and
wherein, in a case where the recording mode is a moving image recording mode, the first setting unit sets the object detection range wider than the object detection range that is set in a case where the recording mode is a still image recording mode.

11. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point and an image capturing condition;
a second detection unit configured to detect a feature area from the image;
a second setting unit configured to set a position of a focus detection area which is to be arranged in the image based on a position of the feature area included in the object detection range; and
a third setting unit configured to set a frame rate for recording a moving image,
wherein the first setting unit sets the object detection range based on the frame rate for recording the moving image.

12. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the grazing point and an image capturing condition;
a second detection unit configured to detect a feature area from the image; and
a second setting unit configured to set a position of a focus detection area which is to be arranged in the image based on a position of the feature area included in the object detection range,
wherein the image capturing condition is a movement of an object detected, and
wherein, in a case where the object is a moving object, the first setting unit sets the object detection range wider than the object detection range that is set in a case where the object is not a moving object.

13. The image capturing apparatus according to claim 12, wherein, in a case where the object is a moving object, the first setting unit sets the object detection range that is wide in a moving direction of the moving object.

14. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point and an image capturing condition;
a second detection unit configured to detect a feature area from the image; and
a second setting unit configured to set a position of a focus detection area which is to be arranged in the image based on a position of the feature area included in the object detection range,
wherein the image capturing condition is whether or not the image capturing apparatus is being panned, and
wherein, in a case where the image capturing apparatus is being panned, the first setting unit sets the object detection range wider than the object detection range that is set in a case where the image capturing apparatus is not being panned.

15. The image capturing apparatus according to claim 14, wherein, in a case where the image capturing apparatus is being panned, the first setting unit sets the object detection range that is wide in a panning direction of the image capturing apparatus.

16. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point and an image capturing condition;
a second detection unit configured to detect a feature area from the image; and a second setting unit configured to set a position of a focus detection area which is to be arranged in the image based on a position of the feature area included in the object detection range, wherein the image capturing condition is followability of an object in a focus adjustment operation, wherein the first setting unit determines a size of the object detection range based on a degree of intensity of the followability, wherein the followability is a degree of following sensitivity for change in an object speed, and wherein, in a case where the degree of the following sensitivity for change in the object speed is a first degree of following sensitivity, the first setting unit sets the object detection range wider than the object detection range that is set in a case where the degree of the following sensitivity is a second degree of following sensitivity that is lower than the first degree of the following sensitivity.

17. An image capturing apparatus comprising:
a memory device that stores a set of instructions; and
at least one processor that executes the set of instructions to function as:
a first detection unit configured to detect a position of a gazing point in an image based on a line-of-sight of a user;
a first setting unit configured to set an object detection range based on the position of the gazing point and an image capturing condition;
a second detection unit configured to detect a feature area from the image; and
a second setting unit configured to set a position of a focus detection area which is to be arranged in the image based on a position of the feature area included in the object detection range, wherein the image capturing condition is followability of an object in a focus adjustment operation, wherein the first setting unit determines a size of the object detection range based on a degree of intensity of the followability, wherein the followability is a degree of object changeability, and wherein, in a case where the degree of the object changeability is a first degree of object changeability, the first setting unit sets the object detection range narrower than the object detection range that is set in a case where the degree of the object changeability is a second degree of object changeability that is lower than the first degree of the object changeability.

18. A method for controlling an image capturing apparatus, the method comprising:
detecting, as first detection, a position of a gazing point in an image based on a line-of-sight of a user;
setting, as first setting, an object detection range based on the position of the gazing point;
detecting, as second detection, a feature area from the image; and
setting, as second setting, a position of a focus detection area which is to be arranged in the image based on a position of the feature area included in the object detection range,
wherein the first setting sets the object detection range according to a size of the focus detection area.

* * * * *